(12) United States Patent
Malladi et al.

(10) Patent No.: US 10,084,627 B2
(45) Date of Patent: Sep. 25, 2018

(54) FREQUENCY HOPPING IN AN SC-FDMA ENVIRONMENT

(75) Inventors: Durga Prasad Malladi, San Diego, CA (US); Byoung-Hoon Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 699 days.

(21) Appl. No.: 11/775,198

(22) Filed: Jul. 9, 2007

(65) Prior Publication Data

US 2008/0089286 A1 Apr. 17, 2008

Related U.S. Application Data

(60) Provisional application No. 60/819,916, filed on Jul. 10, 2006.

(51) Int. Cl.
*H04L 27/26* (2006.01)
*H04B 1/7143* (2011.01)
*H04B 7/26* (2006.01)

(52) U.S. Cl.
CPC ....... *H04L 27/2602* (2013.01); *H04B 1/7143* (2013.01); *H04B 7/2615* (2013.01)

(58) Field of Classification Search
CPC .............. H04L 27/2636; H04L 5/0007; H04L 27/2602; H04B 1/713; H04B 1/7143; H04B 7/2615; H04W 72/00; H04W 72/0413

(Continued)

(56) References Cited

U.S. PATENT DOCUMENTS 6,031,863 A 2/2000 Jusa et al.
6,130,905 A 10/2000 Wakayama (Continued)

FOREIGN PATENT DOCUMENTS

CN 1249098 A 3/2000
CN 1790962 A 6/2006

(Continued)

OTHER PUBLICATIONS

"3GPP TR 25.814 V 7.0.0" 3rd Generation Partnership Project,Jun. 15, 2006 (Jun. 15, 2006), XP002481722, Section 9.1 (pp. 67-90).

(Continued)

*Primary Examiner* — Marcus Hammonds
(74) *Attorney, Agent, or Firm* — Anthony R. Morris

(57) ABSTRACT

Facilitating frequency hopping for single carrier, frequency division multiple access (SC-FDMA) transmission is described herein. By way of example, user data transmitted within a transmission allocation unit can be frequency shifted with respect to time based slots of the allocation unit. As a result, frequency hopping can be accomplished while preserving single carrier constraints and a low peak to average power ratio (PAPR). Furthermore, various frequency shifted mechanisms are disclosed to accomplish preservation of single carrier restraints. For example, a scheduler can select between cyclic frequency shifting, transposed frequency shifting, and multiplexing of frequency selective scheduled and frequency hopped data based on an audit of scheduled data for the transmission allocation unit. As a result, the reduction in interference achieved through frequency hopping can be combined with the low PAPR for various data allocation configurations.

34 Claims, 16 Drawing Sheets

(58) Field of Classification Search
USPC ........ 370/319, 329–330, 347–348, 335–337, 370/342–345; 455/447–452.2, 450–451
See application file for complete search history.

(56) References Cited

U.S. PATENT DOCUMENTS

| | | | |
|---|---|---|---|
| 6,567,015 | B2 | 5/2003 | Adkins et al. |
| 6,954,481 | B1 | 10/2005 | Laroia et al. |
| 7,551,921 | B2 | 6/2009 | Petermann |
| 2004/0081131 | A1 | 4/2004 | Walton et al. |
| 2004/0146211 | A1 | 7/2004 | Knapp et al. |
| 2005/0009473 | A1 | 1/2005 | Ranta et al. |
| 2005/0018791 | A1 | 1/2005 | Molisch et al. |
| 2005/0069022 | A1 | 3/2005 | Agrawal |
| 2005/0078737 | A1 | 4/2005 | Craig et al. |
| 2005/0120097 | A1 | 6/2005 | Walton et al. |
| 2005/0195732 | A1 | 9/2005 | Huh et al. |
| 2005/0265429 | A1 | 12/2005 | Cho et al. |
| 2005/0281188 | A1 | 12/2005 | Cho et al. |
| 2005/0281242 | A1 | 12/2005 | Sutivong et al. |
| 2006/0002355 | A1 | 1/2006 | Baek et al. |
| 2006/0045001 | A1 | 3/2006 | Jalali |
| 2006/0045053 | A1 | 3/2006 | Erlich et al. |
| 2006/0140251 | A1 | 6/2006 | Brown et al. |
| 2006/0171419 | A1 | 8/2006 | Spindola et al. |
| 2007/0116254 | A1 | 5/2007 | Looney et al. |
| 2007/0190950 | A1 | 8/2007 | Madhavan et al. |
| 2007/0202910 | A1 | 8/2007 | Brewer et al. |
| 2007/0259681 | A1* | 11/2007 | Cheng ................ H04L 27/2608 455/522 |
| 2008/0219235 | A1* | 9/2008 | Ma et al. ...................... 370/344 |
| 2008/0273493 | A1* | 11/2008 | Fong ............................ 370/330 |
| 2009/0303938 | A1* | 12/2009 | Kim et al. .................... 370/329 |

FOREIGN PATENT DOCUMENTS

| | | |
|---|---|---|
| JP | 8265322 A | 10/1996 |
| JP | H09294092 A | 11/1997 |
| JP | 10022876 | 1/1998 |
| JP | H1013380 A | 1/1998 |
| JP | 10178370 A | 6/1998 |
| JP | 2001358695 A | 12/2001 |
| JP | 2005045801 A | 2/2005 |
| JP | 2006074564 A | 3/2006 |
| JP | 2006148220 A | 6/2006 |
| JP | 2006180374 A | 7/2006 |
| JP | 2007194749 A | 8/2007 |
| JP | 2010512100 A | 4/2010 |
| RU | 2120702 C1 | 10/1998 |
| WO | WO05036894 | 4/2005 |
| WO | WO2006007527 | 1/2006 |
| WO | WO2006019287 A1 | 2/2006 |
| WO | WO06034577 | 4/2006 |
| WO | WO-2006071056 A1 | 7/2006 |
| WO | WO2007052767 A1 | 5/2007 |
| WO | WO2007139335 A1 | 12/2007 |
| WO | 2008084981 A1 | 7/2008 |

OTHER PUBLICATIONS

Huawei, "Link Performance of D-FDMA and L-FDMA with Frequency Hopping in E-UTRA Uplink," 3GPP TSG RAN WG1; Meeting #45; R1-061401, May 8, 2006-May 12, 2006, XP002481720.
International Search Report and Written Opinion—PCT/US2007/073112, International Search Authority—European Patent Office—dated Nov. 7, 2008.
"Link Analysis of Uplink Interleaved and Localized FDM Waveforms" 3GPP TSG RAN WG1; Meeting #44; R1-060469; QUALCOMM Europe; Feb. 13, 2006-Feb. 17, 2006, pp. 1-11, XP002481721.
Vehicular Technology Conference:"Band division multiple access (BDMA) system. A novel approach for next generation mobile telecommunication system, based on OFDM and SFH-TDMA", Vehicular Technology Conference, 1998. VTC 98. 48th IEEE, May 18-21, 1998 ISBN: 0-7803-4320-4, http://ieeexplore.ieee.org/xpls/abs_all.jsp?arnumber=686455&tag=1.
European Search Report—EP12198449—Search Authority—Munich—dated May 31, 2013.
European Search Report—EP12198456—Search Authority—Munich—dated May 16, 2013.
3GPP TR 25.814, "3rd Generation Partnership Project; Technical Specification Group Radio Access Network; Physical layer aspects for evolved Universal Terrestrial Radio Access (UTRA)", 3rd Generation Partnership Project, Release 7, 3GPP TR 25.814 V7.0.0, Jun. 2006, pp. 1-126.
LG Electronics, "Performance comparison of localized and distributed SC-FDMA", 3GPP TSG RAN WG1 #45, R1-061156, Shanghai, China, May 8, 2006, 4 pages.
NTT DoCoMo et. al., "Data-non-associated L1/L2 Control Channel Structure for E-UTRA Uplink",3GPP TSG RAN WG1 LTE Ad Hoc R1-061675, Jun. 30, 2006, pp. 1-6.
Huawei: "Evaluation on Frequency Hopping for Downlink Shared Data Channel," 3GPP TSG RAN WG1 #44bis Meeting, R1-060976, Athens, Greece, Mar. 27-31, 2006, 6 pages.
Intel Corporation: "Downlink OFDMA resource allocation and mapping rules for distributed mode users in E-UTRA," 3GPP TSG RAN WG1 #44-bis, R1-060873, Athens, Greece, Mar. 27-31, 2006, 5 pages.
LG Electronics: "Localized and distributed SC-FDMA transmission in uplink," 3GPP TSG RAN WG1 LTE Ad Hoc, R1-061774, Cannes, France, Jun. 27-30, 2006, 4 pages.
NEC Group: "Performance Comparison of D-FDMA and L-FDMA with Frequency Hopping for E-UTRA Uplink + TP," TSG-RAN WG1#44Bis, R1-060969, Athens, Greece, Mar. 27-31, 2006, 6 pages.
Nortel: "Performance evaluation of STTD and cyclic shift diversity in Downlink MIMO systems for LTE," 3GPP TSG-Ran Working Group 1 Meeting #44bis, R1-060900, Athens, Greece, Mar. 27-31, 2006, 10 pages.

* cited by examiner

FREQUENCY HOPPING IN AN SC-FDMA ENVIRONMENT

CROSS-REFERENCE TO RELATED APPLICATIONS

This application claims the benefit of U.S. Provisional Patent application Ser. No. 60/819,916 entitled "A METHOD AND APPARATUS FOR FREQUENCY HOPPING FOR SC-FDMA" which was filed Jul. 10, 2006. The entirety of the aforementioned application is herein incorporated by reference.

BACKGROUND

I. Field

The following description relates generally to wireless communications, and more particularly to providing frequency hopping in single carrier frequency division multiple access transmission.

II. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and received antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region. However, conventional techniques can provide limited or no feedback related to channel information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating frequency hopping for single carrier, frequency division multiple access (SC-FDMA) transmission. User data transmitted within a transmission allocation unit can be frequency shifted with respect to time based slots of the allocation unit. As a result, frequency hopping can be accomplished while preserving single carrier restraints and a low peak to average power ratio (PAPR) typically desired with respect to SC-FDMA transmission. Furthermore, various frequency shifted mechanisms are disclosed to accomplish preservation of single carrier restraints. More specifically, a scheduler can select between cyclic frequency shifting, transposed frequency shifting, and multiplexing of frequency selective scheduled data and frequency hopped data based on an audit of scheduled data for the transmission allocation unit. As a result, the reduction in interference achieved through frequency hopping can be combined with the low PAPR achieved via SC-FDMA transmission.

According to related aspects, a method for providing frequency hopping in a single carrier frequency division multiple access (SC-FDMA) transmission that preserves single carrier constraints is described herein. The method can comprise dividing a transmission allocation unit into at least two time based slots, the time based slots have a plurality of frequency sub-divisions. Further, the method can comprise allocating a portion of user data to a first frequency sub-division of a first time slot, and shifting allocation of a subsequent portion of the user data to a second frequency sub-division of a second subsequent time slot.

Yet another aspect relates to an apparatus that provides frequency hopping in SC-FDMA transmission. The apparatus can comprise a means for dividing a transmission allocation unit into at least two time based slots, the time based slots have a plurality of frequency sub-divisions. Additionally, the apparatus can comprise a means for allocating a portion of user data to a first frequency sub-division of a first time slot, and a means for shifting allocation of a subsequent portion of the user data to a second frequency sub-division of a second subsequent time slot.

Another aspect relates to a system that facilitates frequency hopping in SC-FDMA transmission. The system can comprise a multiplexing processor that divides a transmission allocation unit into at least two time based slots, the time based slots have a plurality of frequency sub-divisions. Further, the system can comprise a scheduler that allocates a portion of user data to a first frequency sub-division of a first time slot and allocates a subsequent portion of the user data to a frequency-shifted second frequency sub-division of a second subsequent time slot.

A further aspect relates to a processor that facilitates frequency hopping in SC-FDMA transmission so as to preserve single carrier constraints. The processor can comprise a means for dividing a transmission allocation unit into at least two time based slots, the time based slots have a plurality of frequency sub-divisions. Additionally, the processor can comprise a means for allocating a portion of user data to a first frequency sub-division of a first time slot, and a means for shifting allocation of a subsequent portion of the user data to a second frequency sub-division of a second subsequent time slot.

Still another aspect relates to a computer program product that facilitates frequency hopping in SC-FDMA transmission so as to preserve single carrier constraints. The computer program product can comprise codes executable by at least one computer to divide a transmission allocation unit into at least two time based slots, the time based slots have a plurality of frequency sub-divisions, allocate a portion of user data to a first frequency sub-division of a first time slot, and shift allocation of a subsequent portion of the user data to a second frequency sub-division of a second subsequent time slot.

Another aspect relates to a method for transmitting data over an SC-FDMA uplink channel utilizing frequency hopping. The method can comprise receiving information related to frequency-shifted allocation of user data across a plurality of time slots of a transmission allocation unit for use in a SC-FDMA uplink transmission, and organizing the user data into a transmission data packet in accordance with the received information.

Yet another aspect relates to an apparatus that transmits data over an SC-FDMA uplink channel utilizing frequency hopping. The apparatus can comprise a means for receiving information related to frequency-shifted allocation of user data across a plurality of time slots of a transmission allocation unit for use in a SC-FDMA uplink transmission, and a means for organizing the user data into a transmission data packet in accordance with the received information.

Still another aspect relates to a system that transmits data over an SC-FDMA uplink channel utilizing frequency hopping. Such system can comprise an antenna that receives information related to frequency-shifted allocation of user data across a plurality of time slots of a transmission allocation unit for use in a SC-FDMA uplink transmission. Further, the system can comprise a scheduler that organizes the user data into a transmission data packet in accordance with the received information.

Another aspect relates to a processor that provides transmission of data over an SC-FDMA uplink channel utilizing frequency hopping. The processor can comprise a means for receiving information related to frequency-shifted allocation of user data across a plurality of time slots of a transmission allocation unit for use in a SC-FDMA uplink transmission. Furthermore, the processor can comprise a means for organizing the user data into a transmission data packet in accordance with the received information.

A further aspect relates to a computer program product that facilitates providing transmission of data over an SC-FDMA uplink channel utilizing frequency hopping. The computer program product can comprise codes executable by at least one computer to receive information related to frequency-shifted allocation of user data across a plurality of time slots of a transmission allocation unit for use in a SC-FDMA uplink transmission. Additionally, the computer program product can comprise codes executable by at least one computer to organize the user data into a transmission data packet in accordance with the received information.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
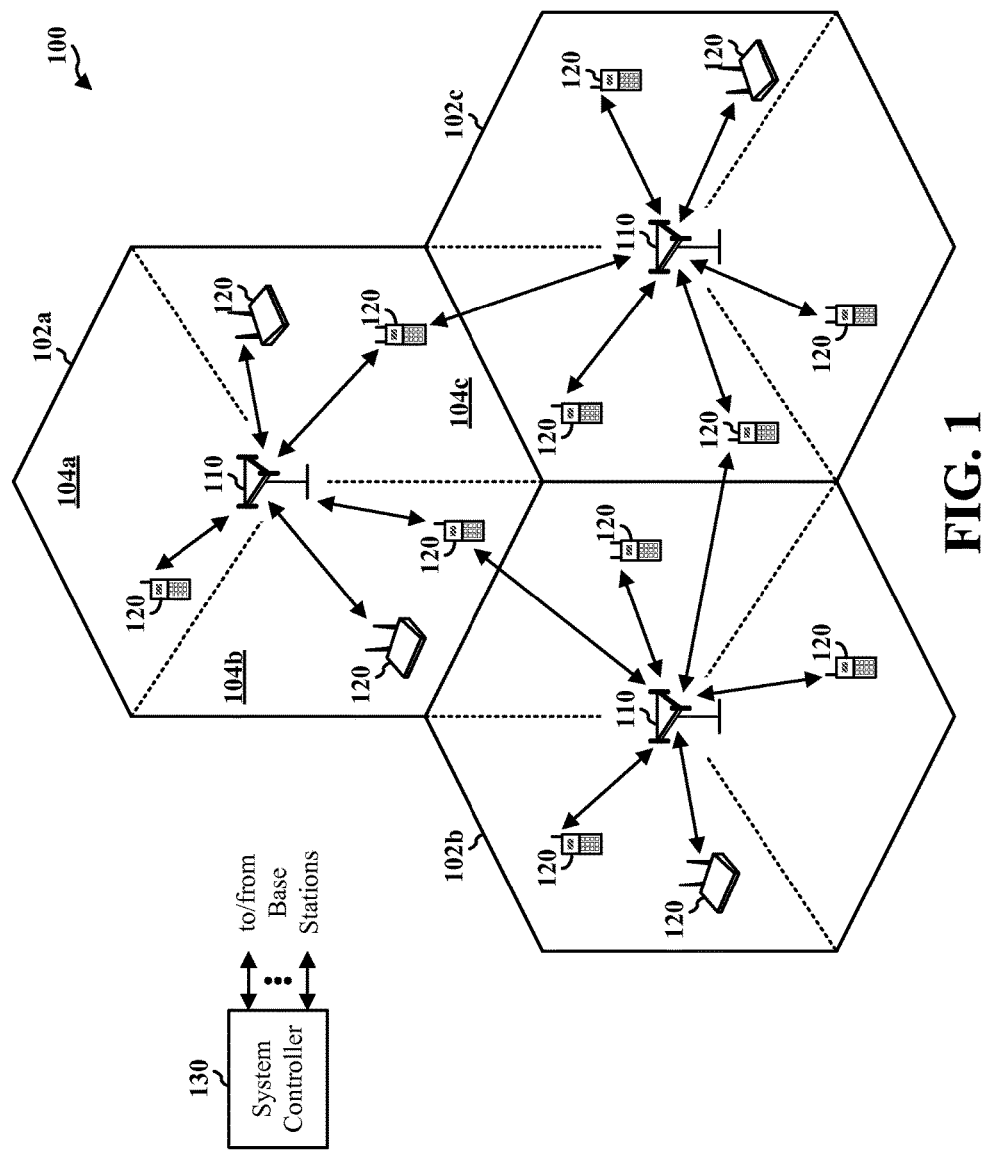
FIG. 1 illustrates a wireless communication system in accordance with various aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are descried in the context of an ad-hoc or unplanned/semi-planned deployed wireless communication environment that provides synchronized transmission and retransmission of SFN data. One skilled in the art should appreciate that similar techniques could apply to other communication environments.

As used in this application, the terms "component," "system," and the like are intended to refer to a computer-related entity, either hardware, software, software in execution, firmware, middle ware, microcode, and/or any combination thereof. For example, a component can be, but is not limited to being, a process running on a processor, a processor, an object, an executable, a thread of execution, a program, and/or a computer. One or more components can reside within a process and/or thread of execution and a component can be localized on one computer and/or distributed between two or more computers. Also, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein can be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a subscriber station. A subscriber station can also be called a system, a subscriber unit, mobile station, mobile, remote station, remote terminal, access terminal, user terminal, user agent, a user device, or user equipment. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

FIG. 1 illustrates a wireless communication system 100 with multiple base stations 110 and multiple terminals 120, such as can be utilized in conjunction with one or more aspects. A base station is generally a fixed station that communicates with the terminals and can also be called an access point, a Node B, or some other terminology. Each base station 110 provides communication coverage for a particular geographic area, illustrated as three geographic areas, labeled 102a, 102b, and 102c. The term "cell" can refer to a base station and/or its coverage area depending on the context in which the term is used. To improve system capacity, a base station coverage area can be partitioned into multiple smaller areas (e.g., three smaller areas, according to cell 102a in FIG. 1), 104a, 104b, and 104c. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the following description, the term "base station" is used generically for a fixed station that serves a sector as well as a fixed station that serves a cell.

Terminals 120 are typically dispersed throughout the system, and each terminal can be fixed or mobile. A terminal can also be called a mobile station, user equipment, a user device, or some other terminology. A terminal can be a wireless device, a cellular phone, a personal digital assistant (PDA), a wireless modem card, and so on. Each terminal 120 can communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for base stations 110. For a distributed architecture, base stations 110 can communicate with one another as needed. Data transmission on the forward link occurs from one access point to one access terminal at or near the maximum data rate that can be supported by the forward link and/or the communication system. Additional channels of the forward link (e.g., control channel) can be transmitted from multiple access points to one access terminal. Reverse link data communication can occur from one access terminal to one or more access points.

Figure 2:
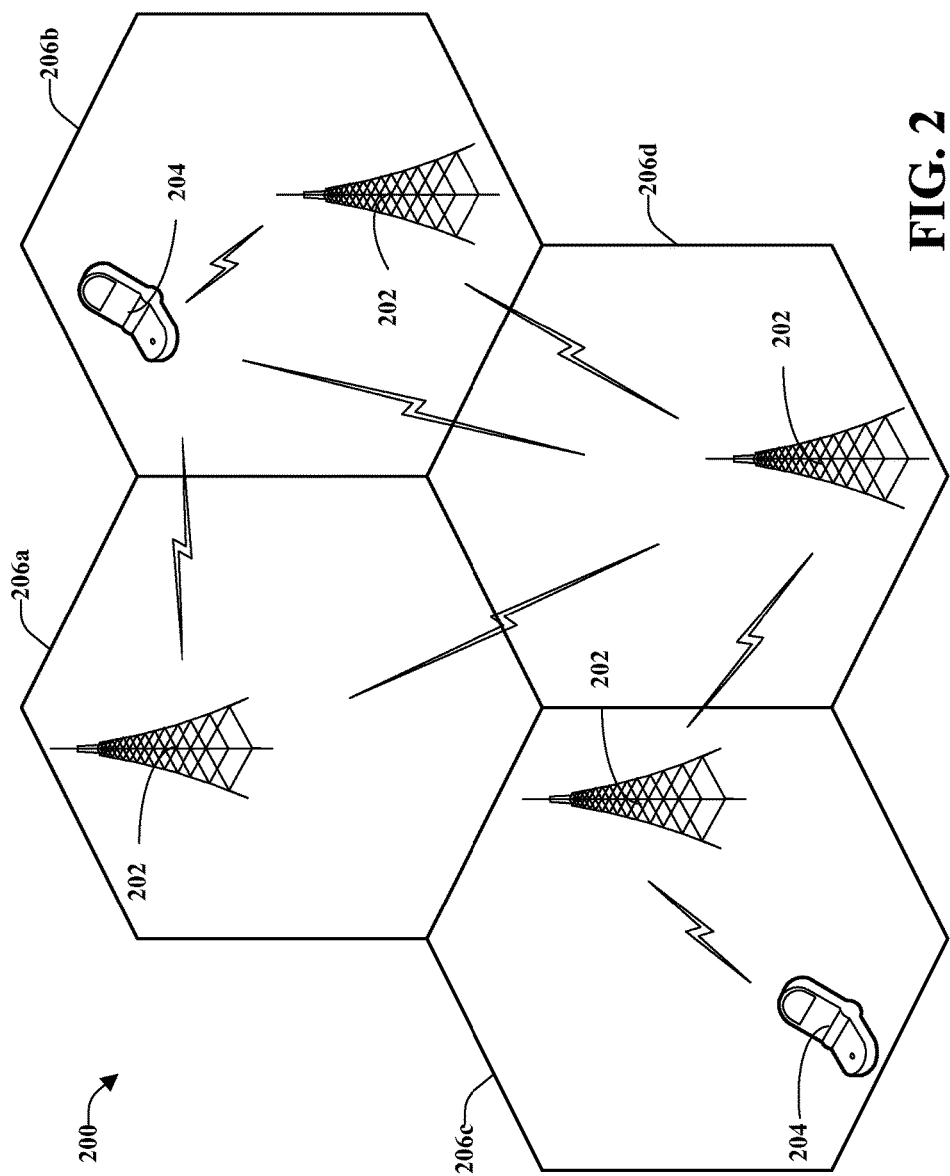
FIG. 2 depicts an example communications apparatus for employment with a wireless communications environment.

FIG. 2 is an illustration of an ad hoc or unplanned/semi-planned wireless communication environment 200, in accordance with various aspects. System 200 can comprise one or more base stations 202 in one or more sectors that receive, transmit, repeat, etc., wireless communication signals to each other and/or to one or more mobile devices 204. As illustrated, each base station 202 can provide communication coverage for a particular geographic area, illustrated as four geographic areas, labeled 206a, 206b, 206c and 206d. Each base station 202 can comprise a transmitter chain and a receiver chain, each of which can in turn comprise a plurality of components associated with signal transmission and reception (e.g., processors, modulators, multiplexers, demodulators, demultiplexers, antennas, and so forth), as will be appreciated by one skilled in the art. Mobile devices 204 can be, for example, cellular phones, smart phones, laptops, handheld communication devices, handheld computing devices, satellite radios, global positioning systems, PDAs, and/or any other suitable device for communicating over wireless network 200. System 200 can be employed in conjunction with various aspects described herein in order to facilitate providing feedback to a wireless communication environment, as set forth with regard to subsequent figures.

Referring to FIGS. 3-7, methodologies relating to providing frequency hopping in a single carrier frequency division multiple access (SC-FDMA) environment are depicted. While typical frequency hopping has been demonstrated in standard FDMA environments, as well as in orthogonal FDMA (OFDMA) environments, a single carrier environment poses particular problems for frequency hopping. First, data and tone assignments for a transmission period cannot be arbitrarily re-shuffled. Doing so can typically destroy single carrier constraints. For instance, contiguous assignments of a local SC-FDMA waveform must be preserved. As a result, the subject disclosure provides restricted hopping strategies that preserve the single carrier constraints. As used herein, three example strategies are provided and termed cyclic shift frequency hopping, mirror transposition frequency hopping, and a multiplexing strategy that integrates frequency hopping with frequency selective scheduling. It should be appreciated, however, that additional frequency shift strategies not particularly articulated herein but included within the scope of the claimed subject matter and related drawings are also incorporated into the subject specification.

While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more aspects.

Figure 3:
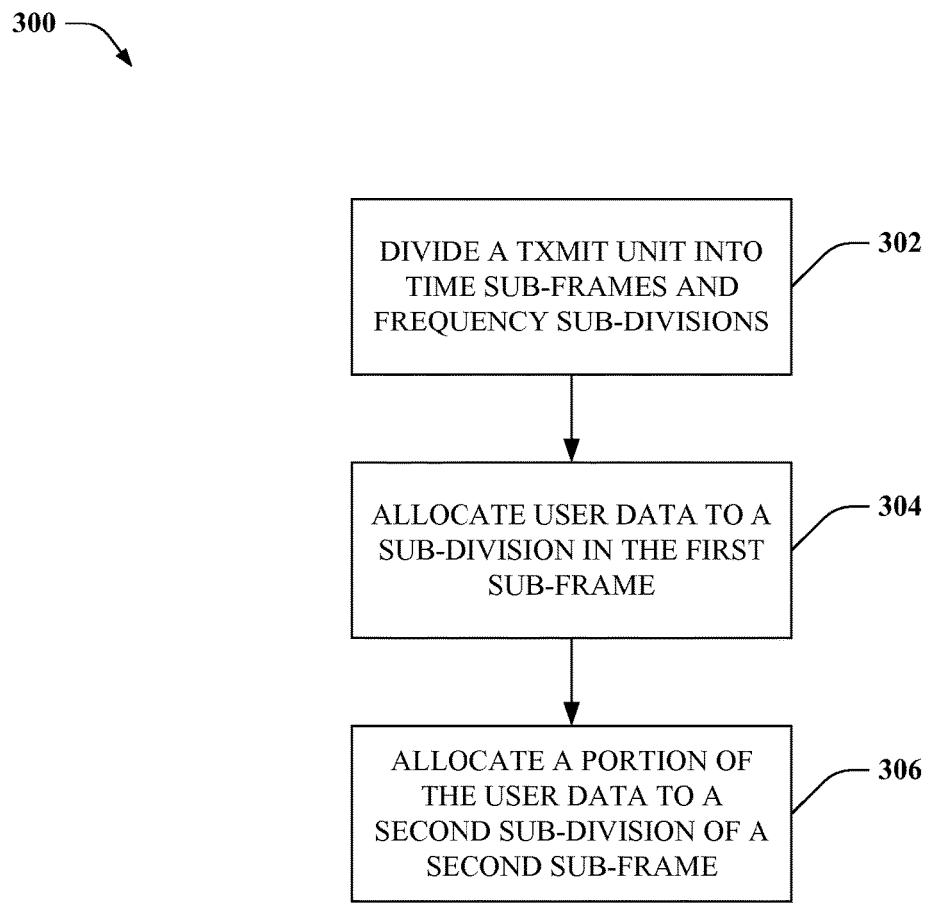
FIG. 3 illustrates an example methodology for facilitating frequency hopping in single carrier frequency division multiple access (SC-FDMA) transmission.

FIG. 3 illustrates an example methodology 300 for facilitating frequency hopping in a SC-FDMA environment. Method 300 can facilitate a controlled frequency hopping strategy consistent with localized SC-FDMA (LFDMA) assignment, so as to provide interference reduction and bandwidth diversity benefits of frequency hopping with low peak to average power ratio (PAPR) qualities of SC-FDMA transmission. As a more specific example, method 300 can divide a transmission allocation resource unit into multiple time and frequency based sub-portions. Further, user data distributed across time based sub-portions can be allocated to different frequency sub-portions. More specifically, in order to preserve contiguous tone assignments necessary to facilitate low PAPR transmission, method 300 can frequency-shift segments of user data linearly across time sub-portions, modulo a total system bandwidth (e.g., see FIG. 9, infra, for a detailed depiction of linear cyclic shift). Alternatively, or in addition, method 300 can mirror transpose segments of user data (e.g., see FIG. 10, infra, for a detailed depiction of mirror transposition) across a center-line of the total system bandwidth.

According to method 300, at 302, an allocation period transmission unit (TXMIT unit) can be divided into a plurality of time based slots, and a plurality of frequency based sub-divisions. For instance, the TXMIT unit can be divided into at least two time based slots, where each slot includes a portion of the plurality of frequency sub-divisions. The TXMIT unit can have a total transmission time interval (TTI) of 1 ms, for instance. In addition, the frequency sub-divisions can each share a portion of a total frequency bandwidth of the TXMIT unit, such as 9 megahertz (MHz), for instance. It should be appreciated that any suitable TTI or total frequency bandwidth can be associated with the TXMIT unit in accordance with the subject disclosure and with single carrier transmission constraints.

At 304, a portion of user data can be allocated to a first frequency sub-division of a first time slot. The user data can be related to any communication network service (e.g., voice services, text services, such as text messaging, instant messaging and the like, data services, such as streaming video, streaming audio, web browsing, transferring data with a remote data network including the Internet, or the like) that can be carried over SC-FDMA related networks. As a more specific non-limiting example, a first portion of data related to a streaming video service can be allocated to a 900 kilohertz (kHz) sub-division of frequency bandwidth associated with a TXMIT unit. More specifically, the 900 kHz sub-division can be any suitable sub-division, such as a first, second, third . . . ninth, or tenth sub-division of a 9 MHz bandwidth of a TXMIT unit. It should be appreciated that one of skill in the art would recognize other suitable combinations of frequency sub-divisions, total bandwidth and data allocation as being within the scope of the claimed subject matter and related disclosure. Such combinations are incorporated herein.

At 306, allocation of a subsequent portion of the user data is shifted to a second frequency sub-division of a second subsequent time slot. Continuing the previous example, the subsequent portion of the user data can be additional streaming video information associated with a streaming video application. Furthermore, the subsequent portion of user data can be allocated to a different 900 kHz frequency sub-division of the second time slot to facilitate frequency hopping between the first and second time slots. As a result, the low interference benefits of frequency hopped transmission can be incorporated into an SC-FDMA environment by method 300. More particularly, a relation between the first frequency sub-division and second frequency sub-division can be maintained that preserves continuity of tone assignments in the transmission (e.g., see FIG. 8 for a detailed depiction of contiguous tone assignments in SC-FDMA transmission). As a result, beneficial low PAPR qualities of LFDMA transmission, that can reduce power output of terminal devices during uplink transmission, can also be maintained. As a result, method 300 can provide a novel approach to incorporating frequency hopping into an SC-FDMA environment, thereby combining the benefits of both transmission architectures.

Figure 4:
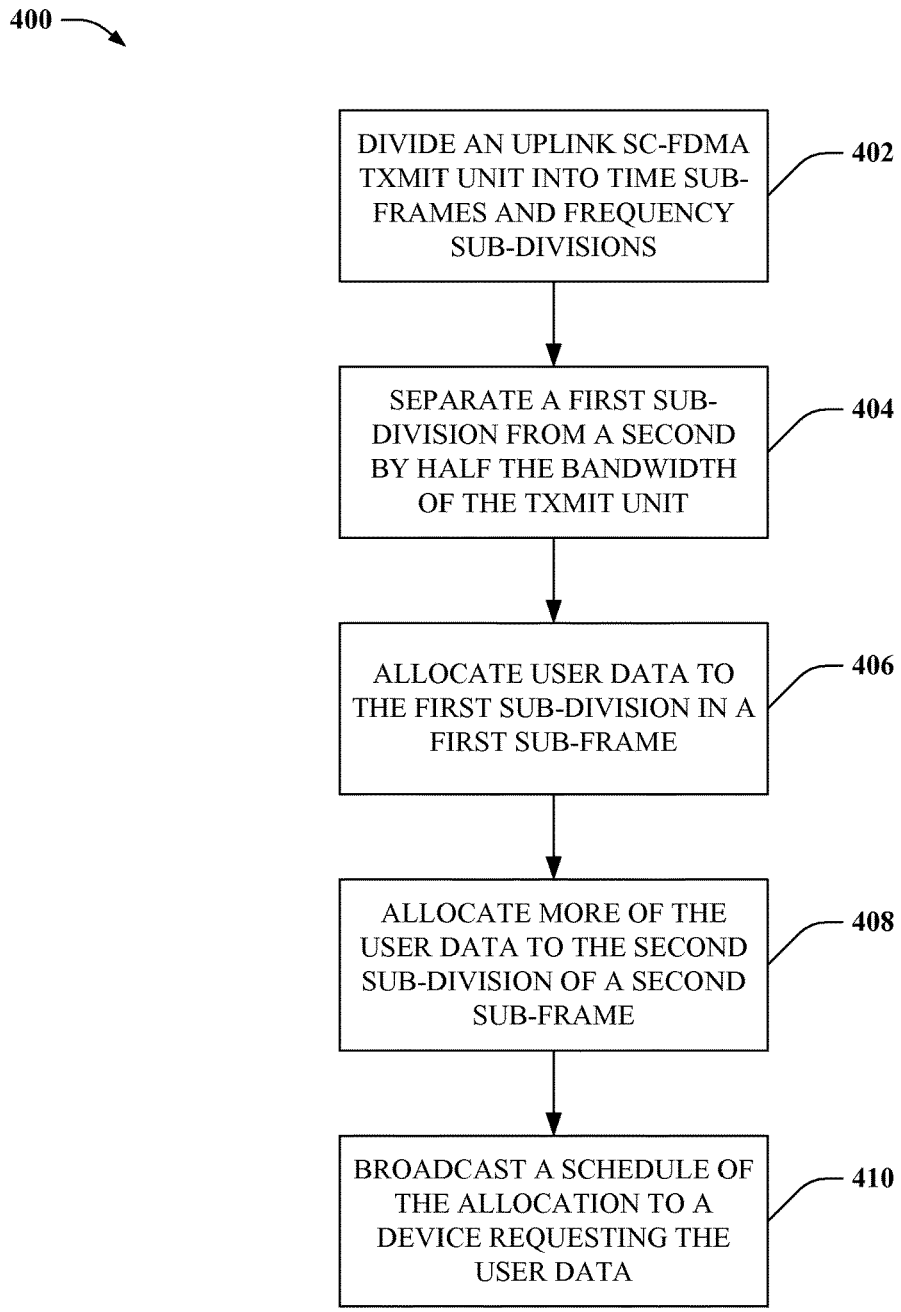
FIG. 4 depicts an example methodology for providing cyclic shift frequency hopping for SC-FDMA transmission.

FIG. 4 depicts an example methodology 400 for providing cyclic shift frequency hopping for SC-FDMA transmission. According to particular aspects, method 400 can provide frequency hopping in a restricted manner that preserves contiguous tone assignment of a scheduled LFDMA allocation period. As a result, method 400 facilitates integrating the benefits of frequency hopping and SC-FDMA communication architectures.

According to method 400, at 402, an uplink SC-FDMA allocation transmission unit (TXMIT unit) can be divided into a plurality of time based slots and a plurality of frequency based sub-divisions. For instance, each slot of the TXMIT unit can be allocated a portion of the total TTI of the TXMIT unit (e.g., 1 ms), and each frequency sub-division can be allocated a portion of a frequency bandwidth of the TXMIT unit (e.g., 9 MHz). Additionally, the frequency sub-divisions can span the entire TTI, such that each time slot is allocated a portion of each frequency sub-division.

At 404, a first frequency sub-division in a first time slot can be separated in frequency from a second frequency sub-division in a second time slot by substantially half of the frequency bandwidth of the TXMIT unit. For instance, if the frequency bandwidth is 9 MHz, then substantially half thereof is substantially 4.5 MHz. Consequently, the first and second sub-divisions can be shifted (e.g., linearly, modulo the total frequency bandwidth) substantially 4.5 MHz in frequency. Furthermore, each of the sub-divisions created at reference number 402 can also be shifted linearly substantially half of the frequency bandwidth of the TXMIT unit, modulo the total frequency bandwidth (e.g., see FIG. 9 for a detailed depiction of linear frequency shift substantially half of a frequency bandwidth).

As an example to illustrate the foregoing, a TXMIT unit in accordance with methodology 400 can have a total bandwidth of 10 MHz. The TXMIT unit can be divided into 4 frequency sub-divisions, each having substantially 2.5 MHz of bandwidth, such that the bandwidths of the 4 frequency sub-divisions add to exactly 10 MHz. Additionally, according to reference number 404, a first frequency sub-division, having 2.5 MHz bandwidth that corresponds to a 0 to 2.5 MHz portion of the total bandwidth for instance, can be separated in frequency from a corresponding sub-division of the second time slot by substantially half the total bandwidth (e.g., 5.0 MHz). As a result, such corresponding sub-division can have substantially a 2.5 MHz bandwidth corresponding to a 5.0 MHz to 7.5 MHz portion of the total bandwidth.

Also in accordance with reference number 404, a linear shift in bandwidth can 'wrap' from an upper end of the total bandwidth spectrum to a lower end of the total bandwidth spectrum, and vice versa. For instance, if a first sub-division of a first time slot corresponds to a 7.5 MHz to 10.0 MHz portion of total bandwidth, a linearly shifted corresponding sub-division (e.g., the second sub-division) in the second time slot can include a 2.5 MHz to 5.0 MHz portion of the total bandwidth. As an additional example a first sub-division having a 5.0 MHz to 7.5 MHz portion of total bandwidth can correspond to a second sub-division having a 0 to 2.5 MHz portion of total bandwidth. As a result, a linear shift in frequency can 'wrap' from the upper bound of a spectrum (e.g., 10.0 MHz) to a lower bound of a spectrum (e.g., 0 MHz), and vice versa. As a result, contiguous tone assignments can be preserved in accordance with aspects of method 400 and in accordance with the disclosed subject matter in general.

At 406, user data can be allocated to a first frequency sub-division in a first time slot. At 408, an additional portion of the user data can be allocated to a second frequency sub-division of a second time slot. For instance, user data can be associated with web browsing traffic. A first portion of the web browsing traffic can be allocated to the first time slot (e.g., time based portion of the TXMIT unit) and a second portion of the web browsing traffic can be allocated to the second time slot. Further, the web browsing traffic in the first time slot can be in a first frequency sub-division allocated to a 0 MHz to 2.5 MHz portion of total bandwidth, as discussed above. Then, by allocating the second portion of the web browsing traffic to a linearly shifting (modulo the total frequency bandwidth) second frequency sub-division allocated to 5.0 MHz to 7.5 MHz of the total bandwidth, frequency hopping can be instituted with a high degree of transmission frequency dispersion. As a result, interference in a corresponding SC-FDMA signal can be greatly reduced, and transmission efficiency increased, due to the frequency dispersion. Additionally, a schedule of the allocation provided at reference numbers 406 and 408 can be broadcast to terminal devices within a cell. As a result, transmissions in accordance with such allocation can preserve contiguous tone assignments, enabling low PAPR associated with SC-FDMA transmission. Consequently, method 400 provides one particular aspect related to providing frequency hopping for single carrier environments.

It should be appreciated that, as described, careful division of frequency sub-divisions can be beneficial to preserving single carrier restraints. If, for instance, a block of user data spans a centerline of a total frequency bandwidth (e.g., a 5.0 MHz centerline of 10.0 MHz total bandwidth, or a 4.5 MHz line of a 9 MHz total bandwidth, and so on), the linearly shifted frequency 'wrapping' technique discussed above can cause user data to appear at an upper boundary of a frequency spectrum and a lower boundary of the frequency spectrum simultaneously, destroying contiguous tone assignments required for single carrier transmission. As a result, avoiding data blocks that span such centerline can help to promote proper SC-FDMA transmission in conjunction with cyclic frequency shifting of method 400. Additionally, further embodiments discussed below provide alternative mechanisms that mitigate problems posed by data blocks that span a frequency spectrum centerline.

Figure 5:
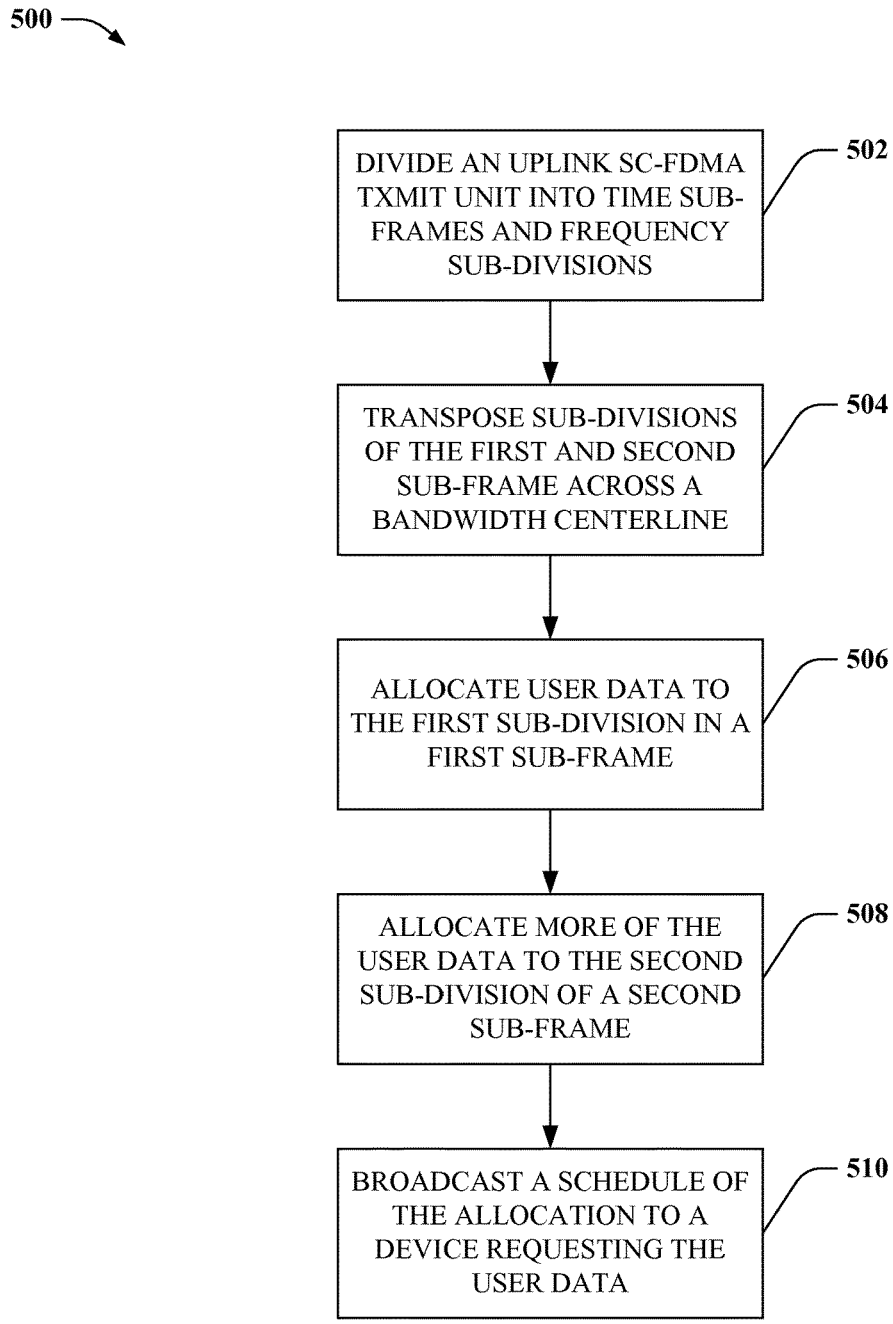
FIG. 5 illustrates an example methodology for providing mirror transposition frequency hopping for SC-FDMA transmission.

FIG. 5 illustrates an example methodology for providing mirror transposition frequency hopping for SC-FDMA transmission. As discussed below, mirror transposition frequency hopping can help mitigate problems associated with data blocks that span a frequency spectrum centerline. For instance, single carrier restraints can require that tone assignments of a data block be contiguous. More specifically, data allocated to a frequency segment of a transmission allocation period should not be interrupted by other data in that segment. As an example, if a block of data is allocated to a 2.5 MHz to 5.0 MHz portion of a frequency spectrum, only data associated with that block should be included within such 2.5 MHz to 5.0 MHz portion to maintain data continuity. If, on the other hand, a frequency segment spans an upper and lower bound of a frequency spectrum simultaneously, data assigned to that frequency segment will not be continuous in frequency (e.g., a second frequency sub-division comprising a 0 to 1.2 MHz portion and an 8.8 MHz to 10.0 MHz portion of a frequency spectrum can result from a 5.0 MHz linear shift and spectrum 'wrapping', discussed above, applied to a first frequency sub-division having a 3.8 MHz to 6.2 MHz portion, spanning the centerline, of a 10.0 MHz total bandwidth spectrum), specifically, because part of the data will be in the lower bound portion, interrupted in frequency from the rest of the data in the upper bound portion (e.g., a portion of the frequency spectrum between 1.2 MHz and 8.8 MHz allocated to other data in regard to the previous 0 to 1.2 MHz and 8.8 MHz to 10.0 MHz example).

A mirror transposition technique described by method 500, below, can mitigate or eliminate problems associated with data spanning a centerline frequency with respect to cyclic shift frequency hopping described by method 400 (see FIG. 10 for a detailed depiction of mirror transposition as utilized by method 500). With mirror transposition, first and second frequency sub-divisions (e.g., corresponding to a first and second time slot, respectively) can be transposed across a centerline frequency of the frequency bandwidth of a TXMIT unit. As a result, the second frequency sub-division can be substantially equidistant above or below the centerline as the first frequency sub-division is substantially below or above, respectively, the centerline. Mirror transposition implies that data blocks spanning the centerline are still contiguous. That is, an upper portion of such block is transposed with a lower portion, and vice versa, but the block still spans the centerline and tone assignments thereof are still contiguous, preserving single carrier constraints.

According to method 500, at 502, an uplink SC-FDMA TXMIT unit can be divided into time based slots and frequency based sub-divisions. At 504, sub-divisions of the first time slot can be transposed with sub-divisions of the second time slot across a centerline of the bandwidth frequency spectrum. As a particular example, a sub-division spanning 0 MHz to 2.5 MHz of a 10.0 MHz spectrum that has a centerline at substantially 5.0 MHz, can be transposed in the second time slot so as to span substantially 7.5 MHz to 10.0 MHz of the 10.0 MHz spectrum. As a further example, a sub-division spanning 4.0 MHz to 6.5 MHz of the 10.0 MHz spectrum, spanning the spectrum centerline, can be transposed by method 500 in the second time slot so as to span substantially 3.5 MHz to 6.0 MHz of the 10.0 MHz spectrum. The latter example illustrates how a data block that spans a frequency spectrum centerline can be frequency hopped in a second time slot to preserve contiguous tone assignments of that frequency spectrum.

At 506, user data can be allocated to a first sub-division in a first time slot. At 508, an additional portion of the user data can be allocated to a second sub-division of a second time slot. At 510, a schedule of the allocation can be broadcast to a device (e.g., a terminal device such as a cell phone, multi-mode phone, wireless device, and so on), requesting the user data for instance. As described, method 500 can provide for frequency hopping in SC-FDMA environments in a manner that preserves contiguous tone assignments. Additionally, the mirror transposition mechanism of method 500 can mitigate or eliminate problems associated with data blocks that span a centerline of a spectrum frequency, as described above.

It should be appreciated that in some scenarios the mirror transposition mechanism of method 500 can be less efficient as compared with cyclic shift frequency hopping. Specifically, in terms of decreased interference typically associated with frequency hopping, mirror transposition can result in lower sub-division dispersity for data blocks near to a centerline frequency of a frequency spectrum. Multiplexing mechanisms, discussed in more detail, infra, can help to alleviate some of the frequency dispersion problems, however.

Figure 6:
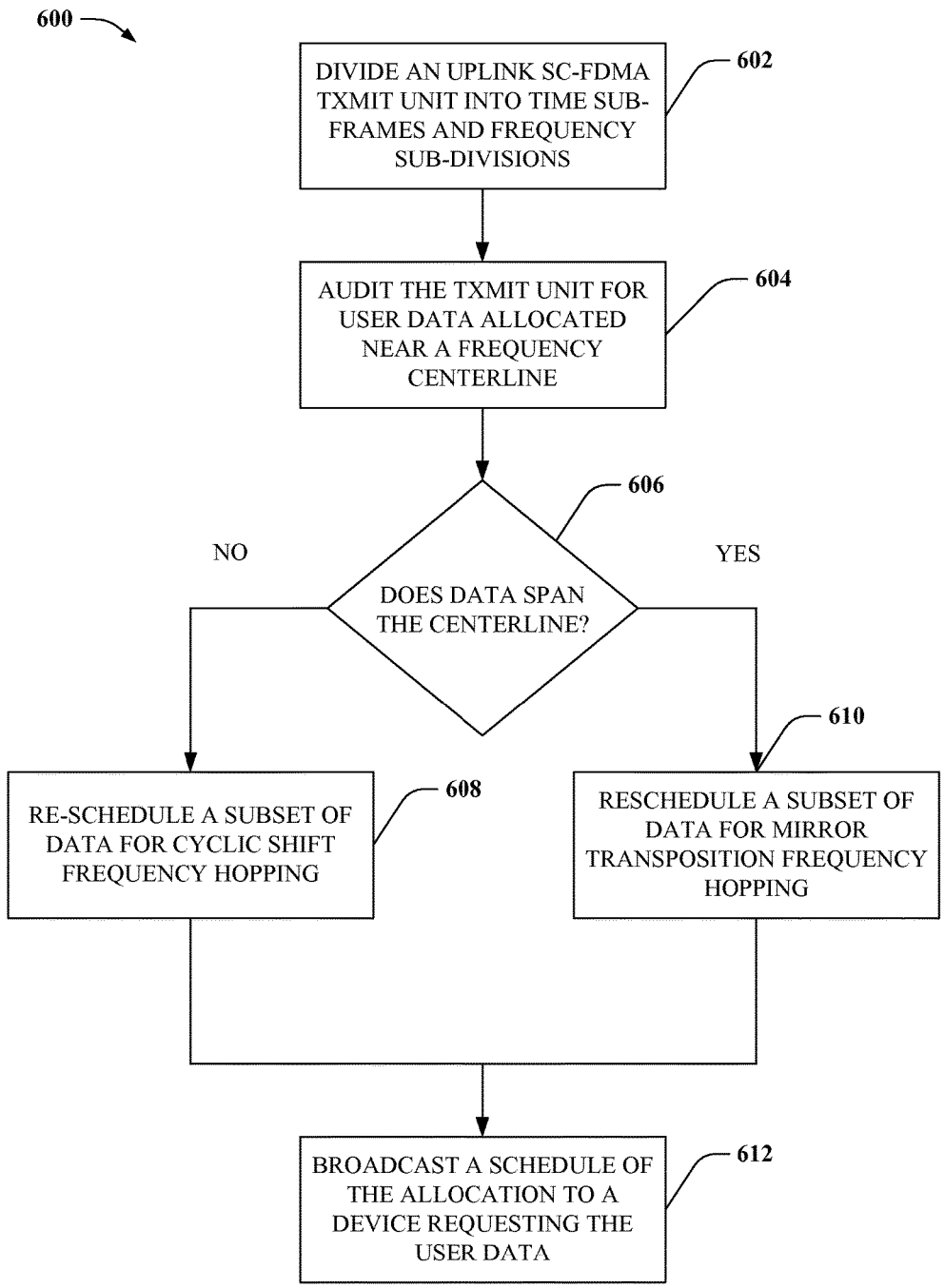
FIG. 6 depicts a sample methodology for choosing between SC-FDMA frequency hopping mechanisms based on an allocation of user data in accordance with one or more aspects.

FIG. 6 depicts a sample methodology 600 for choosing between SC-FDMA frequency hopping mechanisms based on an allocation of user data in accordance with one or more aspects. As depicted, method 600 can analyze a particular allocation of data to a transmission allocation unit to determine a SC-FDMA frequency hopping mechanism, as disclosed herein, most appropriate to low PAPR and interference transmissions. It should be appreciated that other mechanisms for choosing between described frequency hopping mechanisms, not specifically articulated herein but within the scope of the subject disclosure, are incorporated herein.

According to method 600, at 602, an uplink SC-FDMA transmission allocation unit (TXMIT unit) can be divided into time slots and frequency sub-divisions. At 604, the TXMIT unit can be audited to identify user data allocated near a centerline of a frequency spectrum of the TXMIT unit. For instance, user data spanning the centerline can be determined and identified by the audit. At 606, a determination is made as to whether the audit has identified data that spans the centerline. If not, method 600 proceeds to 608 where at least a subset of data allocated within the TXMIT unit can be re-allocated according to cyclic shift frequency hopping as described herein. If the audit at reference number 604 determines data does span the centerline, method 600 can proceed to 610. At 610, at least a subset of the data can be re-allocated in accordance with mirror transposition frequency hopping techniques described herein. Subsequent reference numbers 608 and 610, method 600 can proceed to 612, where a schedule of data allocation can be broadcast to at least one device consuming the user data, for frequency hopped transmission in an SC-FDMA uplink for instance. As described, method 600 can provide alternate frequency hopping mechanisms in an SC-FDMA environment most suitable to preserving single carrier constraints and providing high diversity, low interference and low PAPR transmission.

Figure 7:
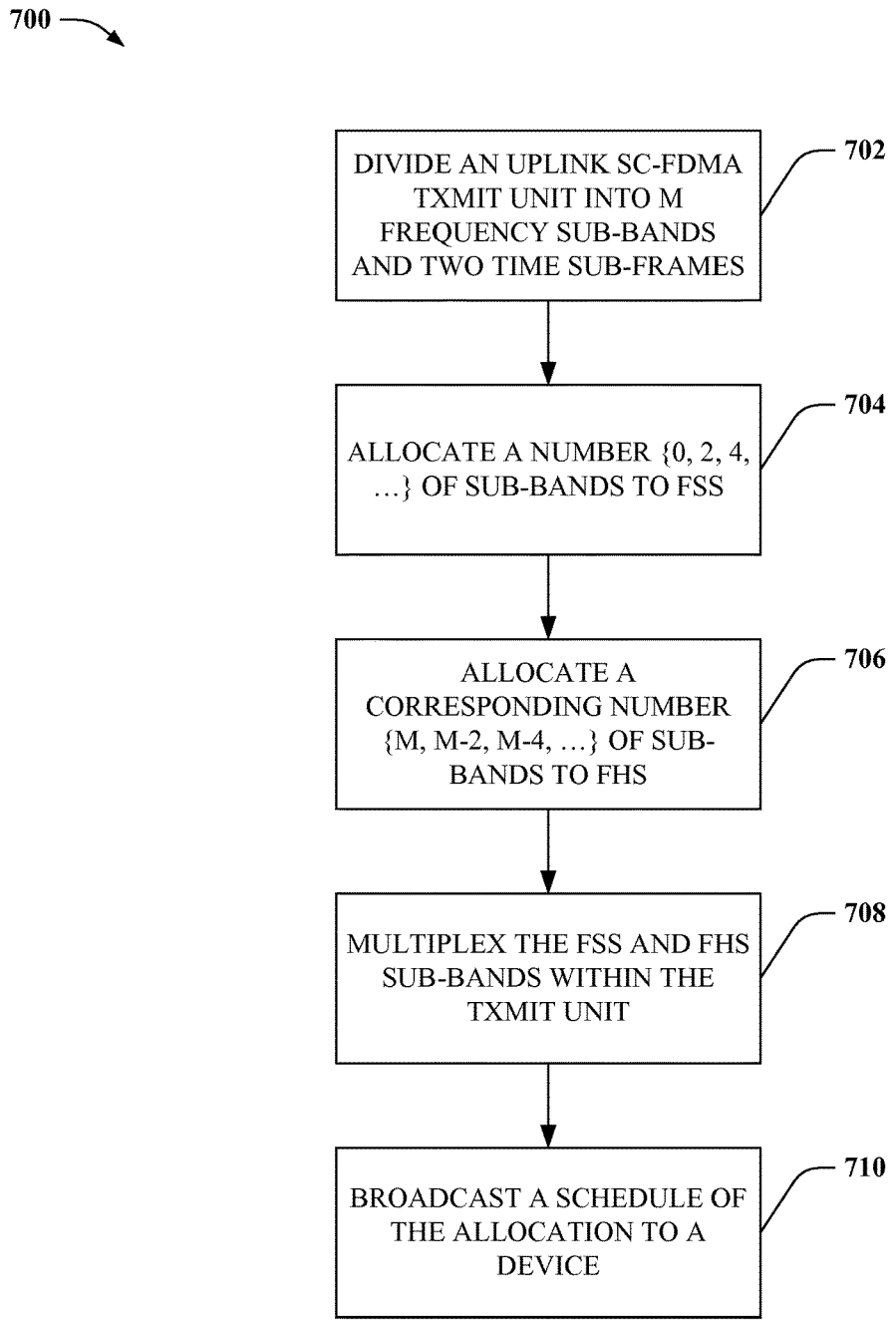
FIG. 7 illustrates an exemplary methodology for multiplexing frequency hopped and non-frequency hopped transmission in an SC-FDMA environment.

FIG. 7 illustrates an exemplary methodology for multiplexing frequency hopped and non-frequency hopped transmission in an SC-FDMA environment. At 702, an uplink SC-FDMA transmission allocation unit (TXMIT unit) can be divided into 'M' frequency sub-bands and at least two time slots, as described herein. At 704, a number of the 'M' sub-bands corresponding to the set {0, 2, 4 . . . } can be allocated to frequency selective scheduling (FSS). More particularly, FSS data can be allocated to substantially constant frequency portions for all or at least a portion of service duration (e.g., video sharing, voice call, web browsing, and so on). At 706, a number of the 'M' sub-bands corresponding to the set {M, M−2, M−4 . . . } can be allocated to frequency hopped scheduling (FHS). Additionally, the allocation of FSS and FHS sub-bands can be constrained such that a total number of assigned sub-bands are equal to 'M'.

In addition to the foregoing, the cyclic shift and/or mirror transposition frequency hopping strategies described supra can be incorporated as part of the frequency hopping allocation at reference number 706. For instance, with respect to cyclic shift frequency hopping, data associated with particular users can be mapped to FHS sub-bands. Such a result can be accomplished by splitting a frequency spectrum into two halves, with a substantially same number of sub-bands in each half. The sub-bands of each half of the spectrum can further be numbered using a like set of numbers (e.g., sub-bands of each half can be numbered 1, 2, 3, 4 . . . respectively). Furthermore, like numbers of sub-bands in each half of the frequency spectrum can both be allocated to either FSS or FHS sets of data (see FIG. 11 for a detailed depiction of allocation of multiplexed FSS and FHS data).

At 708, the FSS and FHS sub-bands can be multiplexed within a TXMIT unit. As a particular non-limiting example, alternating frequency sub-bands can be allocated to FSS and FHS data. As a further non-limiting example, frequency sub-bands at a lower end of a frequency spectrum can be allocated to FSS data while frequency sub-bands at an upper end of the frequency spectrum can be allocated to FHS data, or vice versa. It should be appreciated that one of skill in the art can recognize other allocation strategies, not specifically articulated in the foregoing examples, included within the scope of the subject disclosure, and such strategies are incorporated herein. At 710, a schedule of the allocation of FSS and FHS data can be broadcast to facilitate uplink transmission of data according to a multiplexed frequency hopping strategy described herein. As a result, method 700 can facilitate providing portions of frequency hopped and non-frequency hopped data in a TXMIT unit, to facilitate communication requirements of various terminal devices, for instance.

Figure 8:
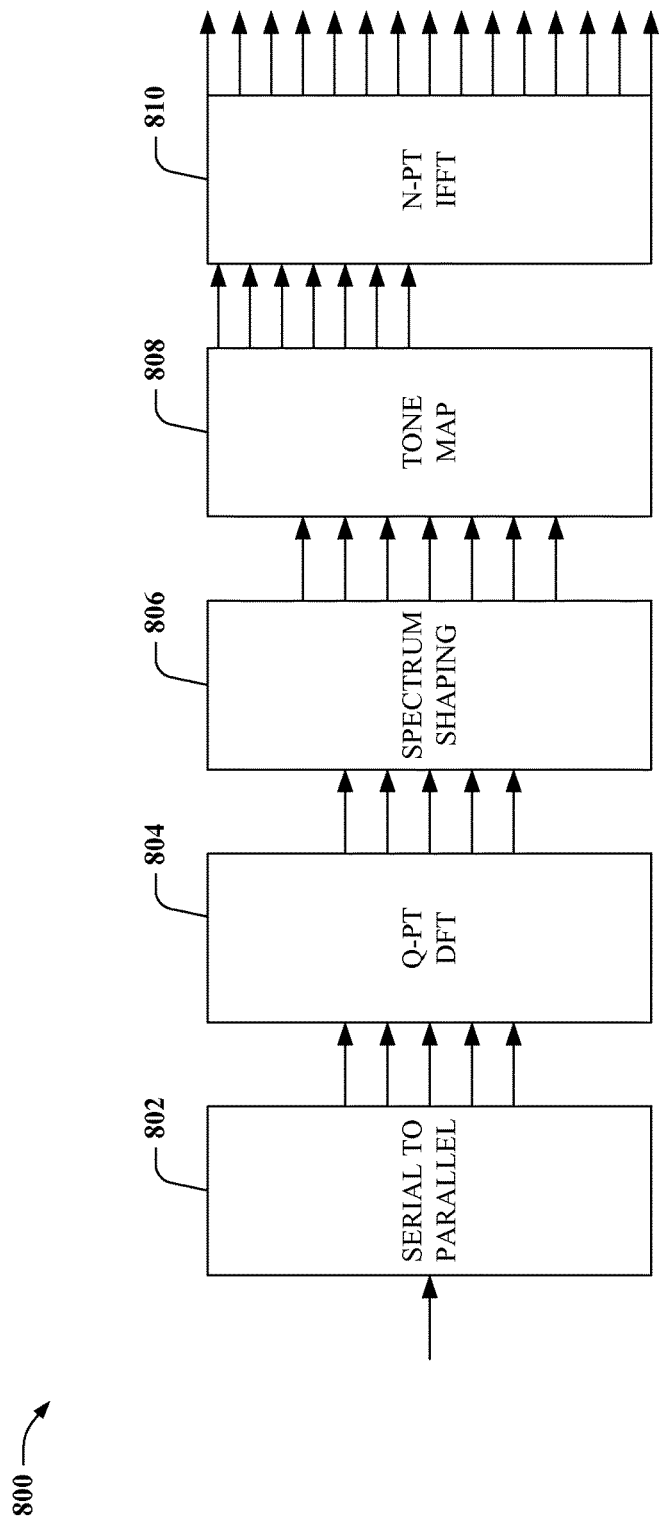
FIG. 8 depicts an example SC-FDMA signal transformation that provides a low peak to average power ratio.

FIG. 8 depicts an example SC-FDMA signal transformation that can provide low peak to average power ratio. A serial to parallel converter 802 can receive an input stream of data, for instance, that has serially multiplexed time-domain modulation symbols. The serial to parallel converter 802 can split the input stream of data into an output stream having parallel time-domain modulation symbols. Such output stream can be provided to a Q-point discrete Fourier transform (Q-pt DFT) device 804. The data stream can then be transformed by the Q-pt DFT 804 to render distinct portions of time domain data into frequency domain data. The portions of data can then be provided to a spectrum shaping component 806 that can further shape the frequency domain spectrum to minimize spectrum leakage. The spectrum shaping component 806 can then send the resulting frequency domain data stream to a tone map component 808 that can adjust sub-carriers within the data stream into a particular portion of a frequency spectrum, for example, occupying contiguous portions of the data stream as required by single carrier constraints. Tone map 808 can then provide the mapped data stream to an N point inverse fast Fourier transform (N-pt IFFT) 810. The N-pt IFFT can transform the frequency domain data stream back into a time domain.

Figure 9:
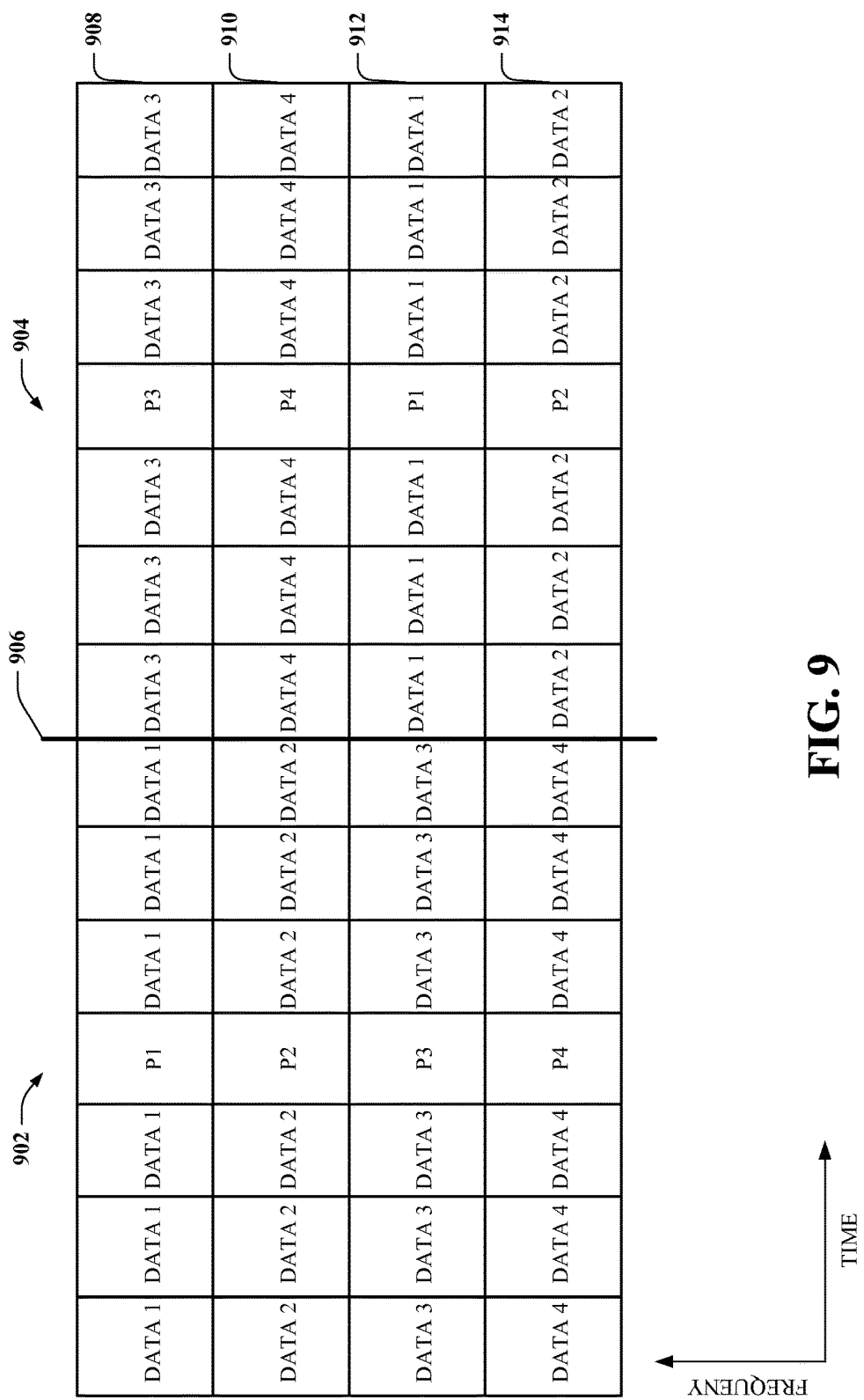
FIG. 9 illustrates a sample transmission allocation unit employing cyclic shift frequency hopping in accordance with one or more aspects.

FIG. 9 illustrates a sample transmission allocation unit (TXMIT unit) employing cyclic shift frequency hopping in accordance with one or more aspects described herein. Specifically, the TXMIT unit can have at least two time based slots 902 and 904, separated by a particular timeline 906. Each slot 902, 904 can be further divided into a plurality of time blocks and a plurality of frequency sub-divisions 908, 910, 912, 914. Therefore, each rectangular portion of data depicted within the TXMIT unit of FIG. 9 comprises a particular time block and a particular frequency sub-division 908, 910, 912, 914.

The various time blocks of the example TXMIT unit as depicted can deliver distinct types of information. For instance, each slot 902, 904 can have 7 time blocks. Furthermore, time blocks can be associated with either communication service data or with pilot information. As a result, each block contains either a 'Data' or a 'P' indicating a data block or a pilot information block. Additionally, pilot information can be associated with a particular service or terminal device (not shown) (e.g., corresponding to Data 1, Data 2, Data 3, or Data 4, or to P1, P2, P3, or P4, for instance, where an integer indicates a $1^{st}$, $2^{nd}$, $3^{rd}$, or $4^{th}$ service or terminal, respectively). Furthermore, data and pilot information associated with a particular service/terminal can be allocated to a specific frequency sub-division 908, 910, 912, 914. As a more specific example, data and pilot information associated with a first service (e.g., Data 1 and P1) can be allocated to a first frequency sub-division 908 in the first time based slot 902 as depicted. Additionally, data and pilot information associated with a second service (e.g., Data 2 and P2) can be allocated to a second frequency sub-division 910, in the first time based slot 902, and so on.

To accomplish cyclic shift frequency hopping, data can be allocated to different frequency sub-divisions 908, 910, 912, 914 in the second time slot 904 as compared with the first time slot 902. As a particular example, a frequency shift between a set of data (e.g., Data 1) transmitted in the first time slot and a corresponding set of data (e.g., Data 1) transmitted in the second time slot can have a linear shift magnitude of substantially one half a total spectrum bandwidth associated with the TXMIT unit. FIG. 9 provides an example of such a shift. Particularly, data associated with a third frequency sub-division 912 in the first time slot 902 (e.g., Data 1) is shifted upward in frequency to a first frequency sub-division 908 in the second time slot 904; a shift of substantially half the total spectrum bandwidth. Additionally, FIG. 9 also depicts frequency 'wrapping as discussed above. More particularly, data allocated to the first frequency sub-division 908 during the first time slot 902 is shifted to the third frequency sub-division 912 and 'wrapped' from the upper portion of the frequency spectrum to a lower portion of the frequency spectrum. It should be appreciated that other frequency shift values other than substantially one half of the total bandwidth spectrum can be accomplished in accordance with the subject innovation, and such frequency shift mechanisms are incorporated as part of the subject disclosure.

Figure 10:
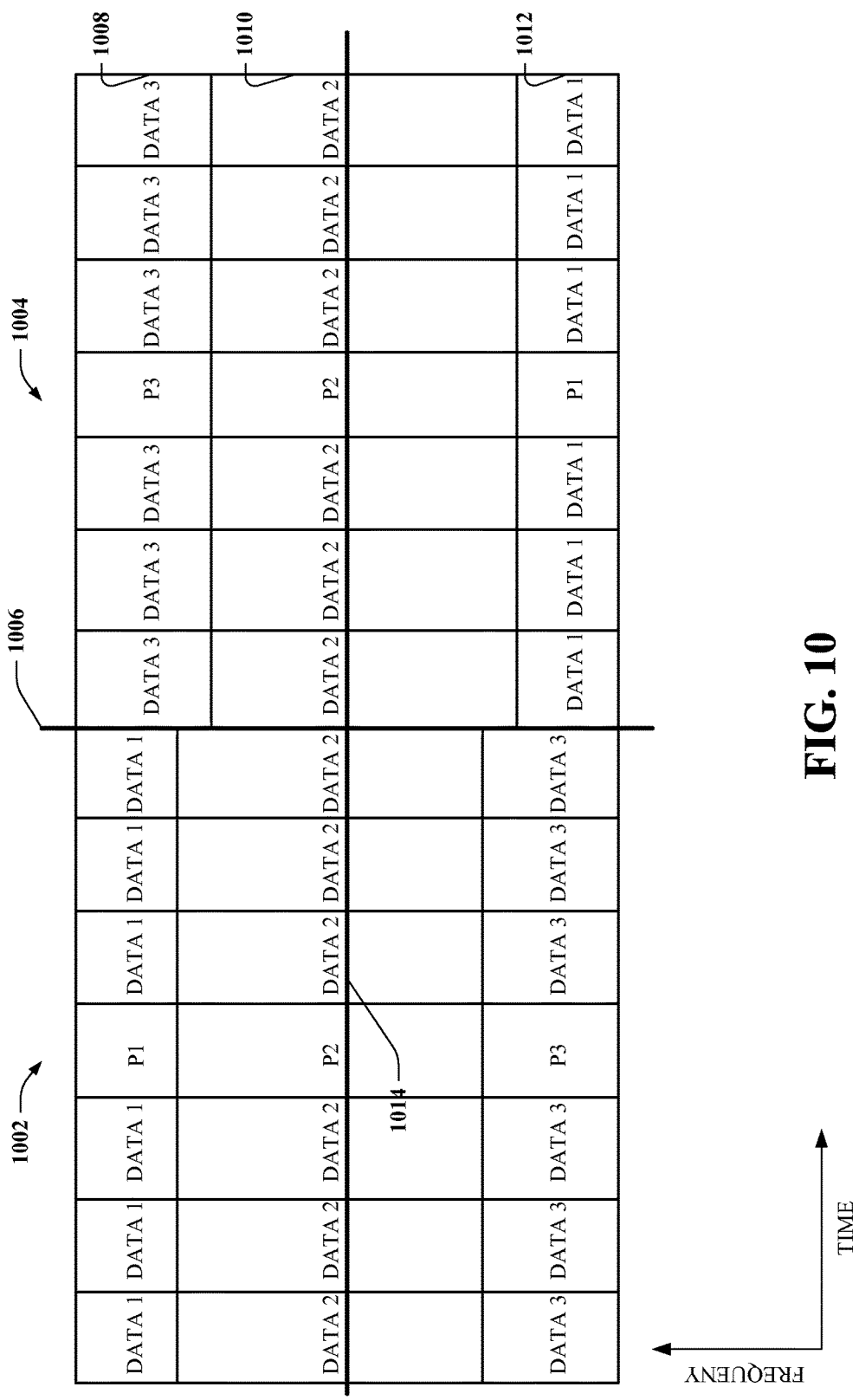
FIG. 10 illustrates a sample transmission allocation unit employing mirror transposition frequency hopping in accordance with additional aspects.

FIG. 10 illustrates a sample transmission allocation unit employing mirror transposition frequency hopping in accordance with additional aspects of the subject disclosure. Specifically, the TXMIT unit can have at least two time based slots 1002 and 1004, separated by a particular timeline 1006 (e.g., representing half the time allocated to the TXMIT unit, such as half of one millisecond). Each time slot 1002, 1004 can be further divided into a plurality of time blocks and a plurality of frequency sub-divisions 1008, 1010, 1012. Therefore, each rectangular portion of data depicted within the TXMIT unit of FIG. 10 comprises a particular time block and a particular frequency sub-division 1008, 1010, 1012.

In a similar manner as described above with respect to FIG. 9, each time slot 1002, 1004 of the example TXMIT unit of FIG. 10 can have 6 time blocks apportioned to data services and at least one time block apportioned to pilot information associated with transmission of such services. Additionally, data and/or pilot information associated with a particular service or terminal device (not shown) (e.g., corresponding to Data 1, Data 2, Data 3, or Data 4, or to P1, P2, P3 or P4, for instance, where an integer indicates a $1^{st}$, $2^{nd}$ $3^{rd}$, or $4^{th}$ service or terminal, respectively) can be allocated to a specific frequency sub-division 1008, 1010, 1012.

To accomplish mirror transposition frequency hopping, data can be allocated to different frequency sub-divisions 1008, 1010, 1012 in the second time slot 1004 as compared with the first time slot 1002. As a particular example, a set of data (e.g., Data 1) transmitted in the first time slot 1002 and a corresponding set of data (e.g., Data 1) transmitted in the second time slot 1004 can be transposed across a centerline 1014 frequency of the total frequency spectrum bandwidth. More particularly, a second sub-division 1008, 1010, 1012 can be shifted in the second time slot 1004 with respect to a corresponding first sub-division 1008, 1010, 1012 in the first time slot 1002 such that the second sub-division 1008, 1010, 1012 is substantially equidistant above (e.g., greater than) or below (e.g., less than) the centerline 1014 as the first frequency sub-division 1008, 1010, 1012 is substantially below or above, respectively, the centerline 1014. FIG. 10 provides an example of such a shift. Particularly, a first block of data (e.g., Data 1) allocated to a first frequency sub-division 1008 in the first time slot 1002 is depicted as transposed across the frequency centerline 1014 into a third frequency sub-division 1012 in the second time slot 1004. More particularly, the third sub-division 1012 is substantially as far below (e.g., less than) the centerline 1014 frequency in the second time slot 1004 as the first sub-division 1008 is above (e.g., greater than) the centerline 1014 in the first time slot 1002, in accordance with transposition about such centerline 1014.

In addition to the foregoing, mirror transposition frequency hopping as depicted at FIG. 10 can mitigate or eliminate non-continuity of tone assignment that can occur with respect to cyclic shift frequency hopping. A second frequency sub-division 1010 spans the frequency spectrum centerline 1014 in the first time slot 1002, and is continuous in the first time slot 1002. However, when transposed across the frequency spectrum centerline 1014 into the second time slot 1004 as described above, the block of data (e.g., Data 2) is still continuous in the second time slot 1004. As a result, contiguous tone assignment constraints required for single carrier transmission can be preserved by mirror transposition frequency hopping as depicted. It should be appreciated that other examples of mirror transposition not particularly depicted within FIG. 10 (e.g., having additional frequency sub-divisions, multiple frequency division lines, such as quadrant lines etc., or the like) but recognized by one of skill in the art as within the scope of the disclosed subject matter are incorporated herein.

Figure 11:
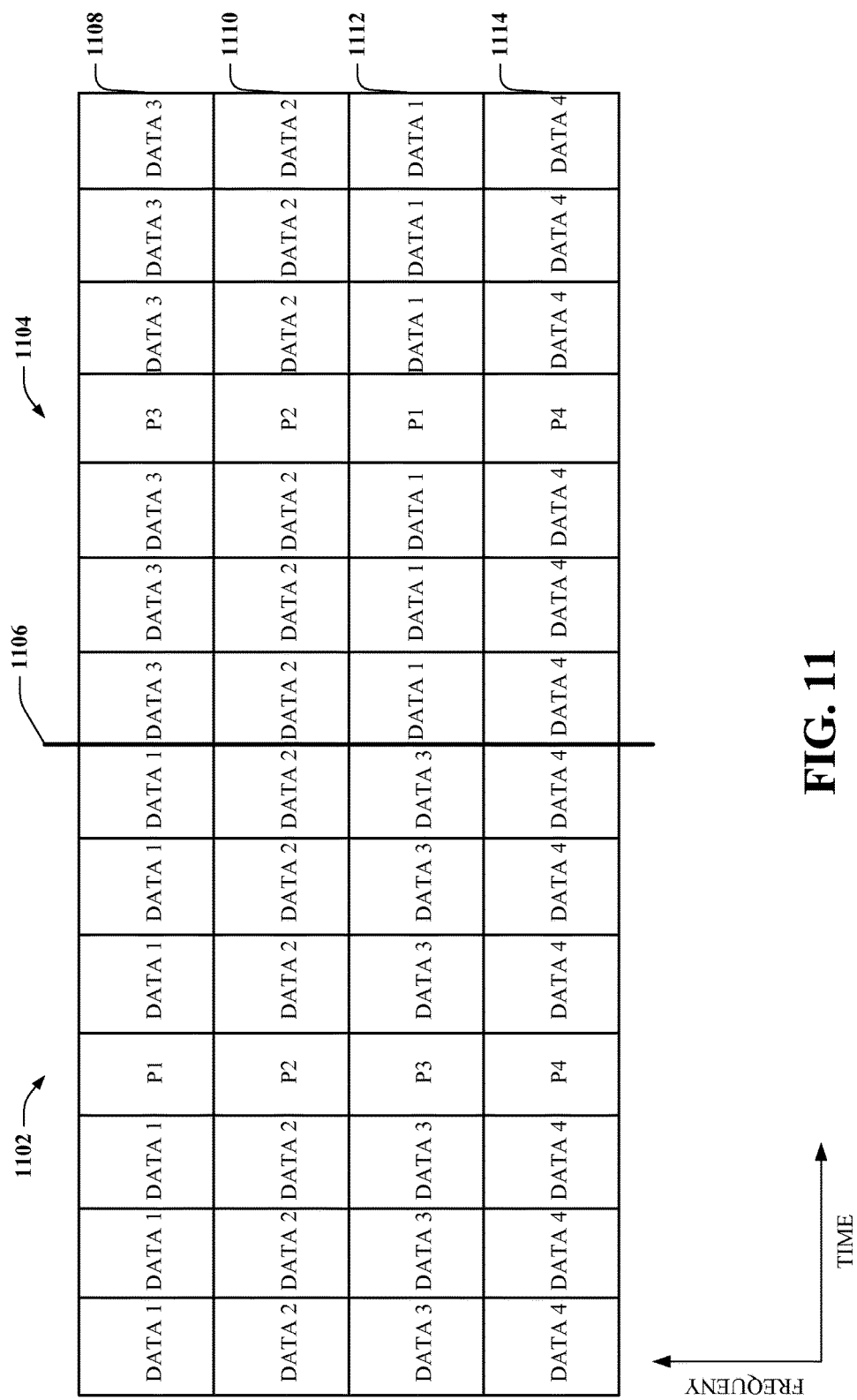
FIG. 11 depicts an example transmission allocation unit employing multiplexed frequency hopped and non-frequency hopped user data in accordance with further aspects.

FIG. 11 depicts an example transmission allocation unit (TXMIT unit) employing multiplexed frequency hopped and non-frequency hopped user data in accordance with further aspects. A TXMIT unit as described herein can include at least two time based slots 1102, 1104, wherein data corresponding to a service or particular terminal can be shifted in frequency with respect to the two slots 1102, 1104 to facilitate frequency hopping in an SC-FDMA environment.

Frequency hop multiplexing can incorporate dividing frequency sub-divisions into two groups and assigning like sub-divisions of the groups to a particular frequency hop scheduling (FHS) or frequency selective scheduling (FSS). For instance, the frequency sub-divisions 1108, 1110 substantially greater than a particular frequency (e.g., centerline frequency) can form a first group, and frequency sub-divisions 1112, 1114 substantially less than the particular frequency can form the second group. For instance, a centerline frequency (not depicted) between sub-divisions 1110 and 1112 can delineate sub-division groups. Data within sub-divisions 1108, 1110 of higher frequency than the centerline can form group one. Data within sub-divisions lower 1112, 1114 than the centerline frequency can form group two. Sub-divisions of each group can also be listed with a common set of numbers. For example, a set of numbers sufficient to list sub-divisions 1108, 1110, 1112, 1114 into two groups can include {1, 2}. More specifically, sub-division 1108 of the first group can be numbered 1 and sub-division 1110 of the first group can be numbered 2. In substantially similar fashion, sub-division 1112 of the second group can be numbered 1 and sub-division 1114 of the second group can be numbered 2.

Each sub-division 1108, 1110, 1112, 1114 assigned to like numbers (e.g., 1 or 2) within different groups (e.g., the first or second group) can be allocated to either FHS transmission or FSS transmission. As depicted by FIG. 11, sub-division 1108, the first sub-division above the centerline, is allocated to FHS, and consequently data (e.g., Data 1) associated with the first sub-division 1108 is shifted to the third sub-division 1112 in the second slot 1104. Data allocated to sub-division 1110, the second sub-division within group one as defined above, is scheduled as FSS, and consequently such data (e.g., Data 2) is also allocated to the second sub-division 1110 in the second slot 1104. In a like manner sub-division 1 1112 of group two and sub-division 2 1114 of group two are allocated to FHS and FSS scheduling, respectively. It should be appreciated that other forms of frequency hopping (e.g., mirror transposition or multiplexed frequency hopping) as described herein or made known to one of skill in the art by way of the examples articulates herein, are incorporated into the subject disclosure.

Figure 12:
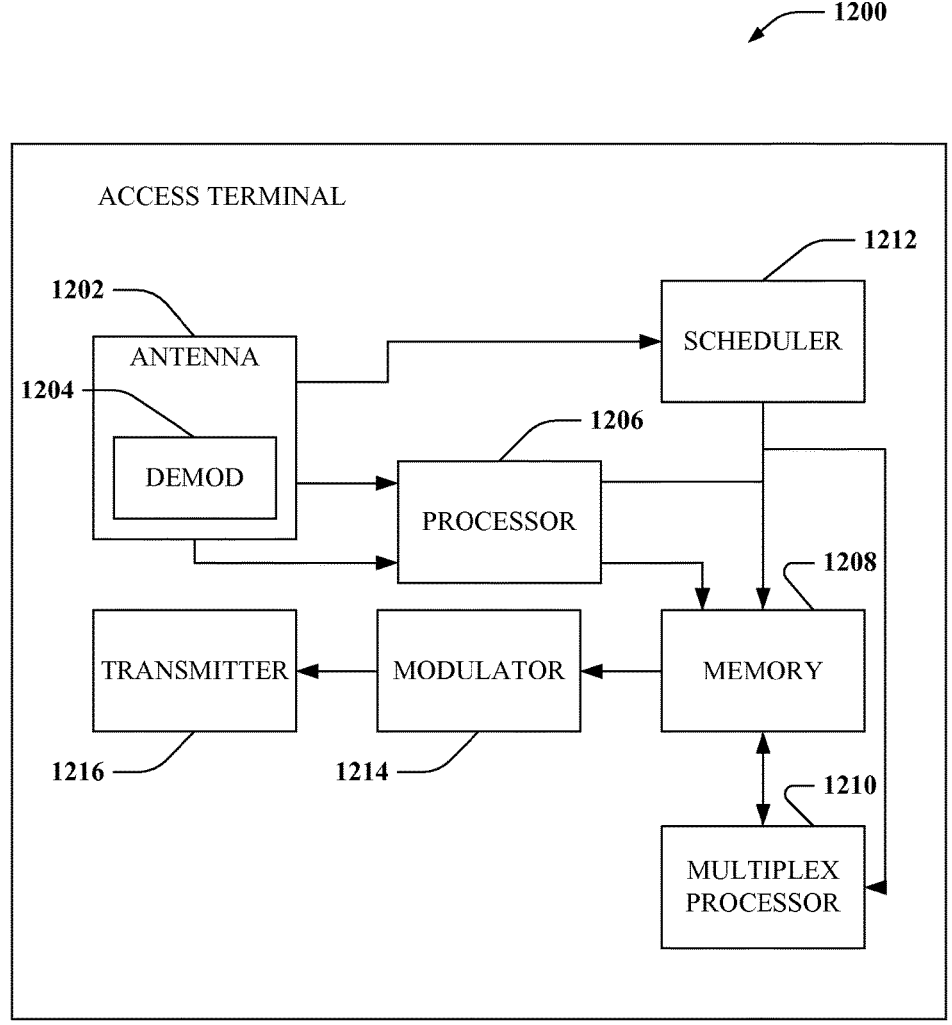
FIG. 12 illustrates a sample access terminal that can utilize frequency hopping in uplink SC-FDMA transmission according to one or more aspects.

FIG. 12 illustrates a sample access terminal that can utilize frequency hopping in uplink SC-FDMA transmission according to one or more aspects. Access terminal 1200 comprises an antenna 1202 (e.g., a transmission receive) that receives a signal and performs typical actions on (e.g., filters, amplifies, downconverts, etc.) the received signal. Specifically, antenna 1202 can also receive information related to frequency-shifted allocation of user data across a plurality of slots of a transmission allocation unit for use in a SC-FDMA uplink transmission, or the like. Antenna 1202 can comprise a demodulator 1204 that can demodulate received symbols and provide them to a processor 1206 for evaluation. Processor 1206 can be a processor dedicated to analyzing information received by antenna 1202 and/or generating information for transmission by a transmitter 1216. Additionally, processor 1206 can be a processor that controls one or more components of access terminal 1200, and/or a processor that analyzes information received by antenna 1202, generates information for transmission by transmitter 1216, and controls one or more components of access terminal 1200. Additionally, processor 1206 can execute instructions for interpreting an allocation schedule associated with uplink transmission (e.g., to a base station), or the like.

Access terminal 1200 can additionally comprise memory 1208 that is operatively coupled to processor 1206 and that can store data to be transmitted, received, and the like. Memory 1208 can store information related to uplink allocation data, protocols for implemented frequency hopping, protocols for organizing data within an allocation transmission unit, de-multiplexing frequency hopped data, multiplexing frequency hopped and scheduled data in an uplink transmission, and the like.

It will be appreciated that a data store (e.g., memory 1208) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1208 of the subject systems and methods is intended to comprise, without being limited to, these and any other suitable types of memory.

Antenna 1202 can further be operatively coupled to scheduler 1212 that can organize user data into a transmission data packet in accordance with information received by antenna 1202. More specifically, scheduler 1212 can frequency-shift user data within different slots of the transmission data packet by substantially one half of a frequency bandwidth allocated for uplink transmission (e.g., provide for uplink SC-FDMA transmission). Furthermore, such user data can be allocated to frequency shifted sub-divisions of the allocation unit that are transposed across a centerline frequency of a frequency bandwidth associated with the transmission allocation unit.

Scheduler 1212 can be further coupled to a multiplex processor 1210. Multiplex processor 1210 can select between non-frequency shifted user data and frequency shifted user data in accordance with an uplink transmission schedule provided by a component of a wireless network (e.g., base station). Data selected by the multiplex processor can be provided to scheduler 1212 for incorporation within a transmission data packet. Additionally, multiplex processor 1210 can be operatively coupled with memory 1208 to access multiplexing protocols stored therein.

Access terminal 1200 still further comprises a modulator 1214 and a transmitter 1216 that transmits a signal (e.g., including a transmission data packet) for instance, to a base station, an access point, another access terminal, a remote agent, etc. Although depicted as being separate from the processor 1206, it is to be appreciated that multiplex processor 1210 and scheduler 1212 can be part of processor 1206 or a number of processors (not shown).

Figure 13:
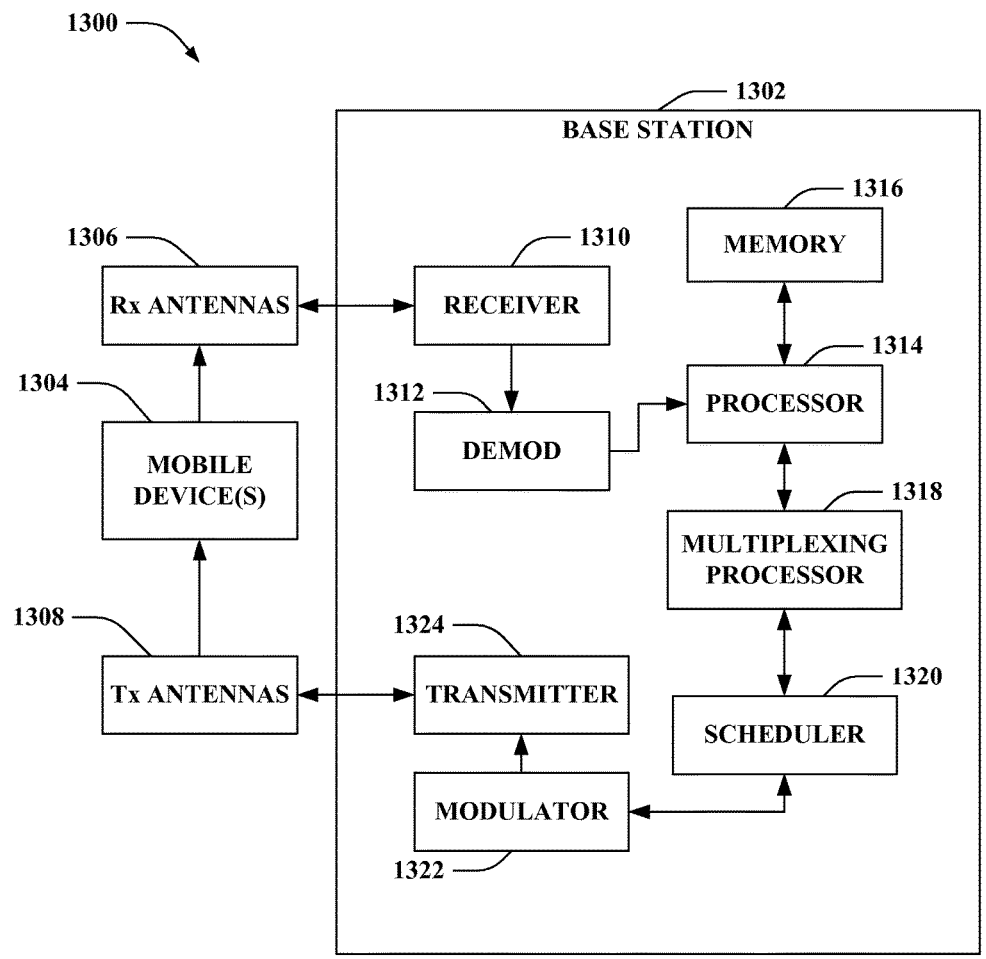
FIG. 13 depicts an example base station that can be employed in conjunction with a wireless networking environment as described herein.

FIG. 13 is an illustration of a system 1300 that facilitates frequency hopping in SC-FDMA environments in a manner that preserves single carrier constraints. System 1300 comprises a base station 1302 (e.g., access point, . . . ) with a receiver 1310 that receives signal(s) from one or more mobile devices 1304 through a plurality of receive antennas 1306, and a transmitter 1324 that transmits to the one or more mobile devices 1304 through a transmit antenna 1308. Receiver 1310 can receive information from receive antennas 1306 and can further comprise a signal recipient (not shown) that receives uplink data scheduled in accordance with a transmission allocation period provided by base station 1302. Additionally, receiver 1310 is operatively associated with a demodulator 1312 that demodulates received information. Demodulated symbols are analyzed by a processor 1314 that is coupled to a memory 1316 that stores information related to providing frequency hopping in a manner that preserves single carrier constraints of a SC-FDMA transmission, providing an audit of a transmission allocation period to determine location of user data with respect to a frequency centerline, choosing between frequency hopping techniques to conserve contiguous tone assignments, and/or any other suitable information related to performing the various actions and functions set forth herein.

Processor 1314 is further coupled to a multiplexing processor 1318 that can divide a transmission allocation unit into at least two time based slots, the time based slots have a plurality of frequency sub-divisions. Additionally, multiplexing processor 1318 can frequency-shift one or more frequency sub-divisions of the transmission allocation unit relative to each other. As a particular example, frequency sub-divisions in a first time slot can be shifted by substantially half of a transmission bandwidth in a second time slot. Alternately, or in addition, frequency sub-divisions can be transposed across a centerline frequency of the frequency bandwidth associated with the transmission allocation unit as described herein. Moreover, the multiplexing processor 1318 can integrate user data allocated to a first frequency sub-division of a first time slot and a second frequency sub-division of a second subsequent time slot with additional user data allocated to substantially equivalent frequency sub-divisions associated with the first and second time slots.

Multiplexing processor 1318 can be coupled to a scheduler 1320 that can allocate a portion of user data to a first frequency sub-division of a first time slot and allocates a subsequent portion of the user data to a frequency-shifted second frequency sub-division of a second subsequent time slot. Additionally, the scheduler 1320 can be coupled to the transmitter 1324 that, in addition to the foregoing, can broadcast information related to allocation of the first portion of user data and shifted allocation of the second portion of user data to a terminal device for use in a SC-FDMA uplink transmission.

In addition to the foregoing, processor 1314 can evaluate a schedule of user data to identify the second frequency sub-division of the second subsequent time slot allocated to the subsequent portion of the user data. More particularly, the processor 1314 can determine whether the user data is allocated across a centerline of a transmission bandwidth associated with the transmission allocation unit. If such a determination is made, multiplexing processor 1318 can choose between one or more frequency hopping strategies to preserve single carrier constraints as described herein.

Figure 14:
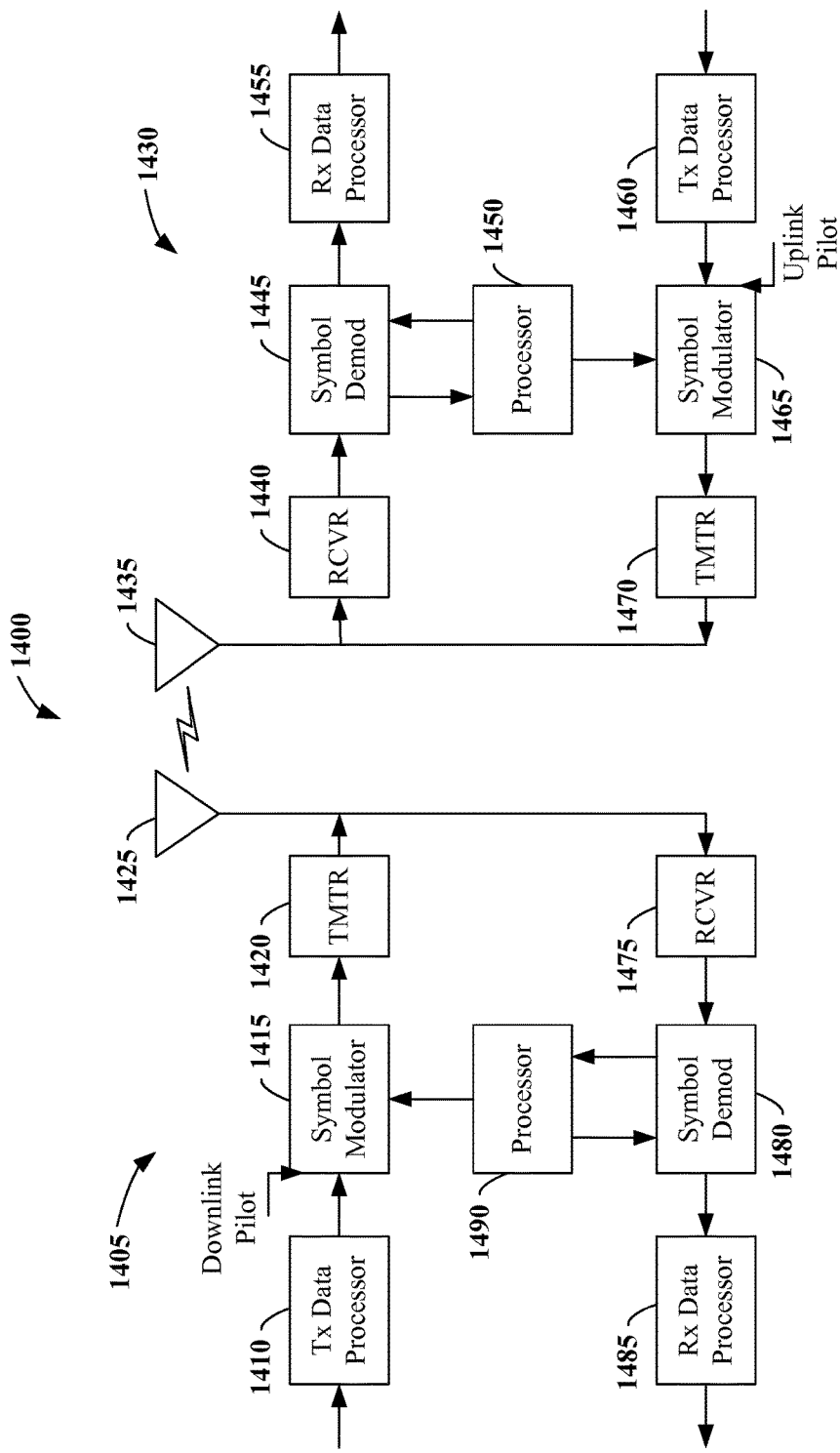
FIG. 14 illustrates a sample system that facilitates frequency hop transmission in an SC-FDMA environment in accordance with aspects disclosed herein.

Referring now to FIG. 14, on a downlink, at access point 1405, a transmit (TX) data processor 1410 receives, formats, codes, interleaves, and modulates (or symbol maps) traffic data and provides modulation symbols ("data symbols"). A symbol modulator 1415 receives and processes the data symbols and pilot symbols and provides a stream of symbols. A symbol modulator 1420 multiplexes data and pilot symbols and provides them to a transmitter unit (TMTR) 1420. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1420 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1425 to the terminals. At terminal 1430, an antenna 1435 receives the downlink signal and provides a received signal to a receiver unit (RCVR) 1440. Receiver unit 1440 conditions (e.g., filters, amplifies, and frequency downconverts) the received signal and digitizes the conditioned signal to obtain samples. A symbol demodulator 1445 demodulates and provides received pilot symbols to a processor 1450 for channel estimation. Symbol demodulator 1445 further receives a frequency response estimate for the downlink from processor 1450, performs data demodulation on the received data symbols to obtain data symbol estimates (which are estimates of the transmitted data symbols), and provides the data symbol estimates to an RX data processor 1455, which demodulates (i.e., symbol demaps), deinterleaves, and decodes the data symbol estimates to recover the transmitted traffic data. The processing by symbol demodulator 1445 and RX data processor 1455 is complementary to the processing by symbol modulator 1415 and TX data processor 1410, respectively, at access point 1405.

On the uplink, a TX data processor 1460 processes traffic data and provides data symbols. A symbol modulator 1465 receives and multiplexes the data symbols with pilot symbols, performs modulation, and provides a stream of symbols. A transmitter unit 1470 then receives and processes the stream of symbols to generate an uplink signal, which is transmitted by the antenna 1435 to the access point 1405. Specifically, the uplink signal can be in accordance with SC-FDMA requirements and can include frequency hopping mechanisms as described herein.

At access point 1405, the uplink signal from terminal 1430 is received by the antenna 1425 and processed by a receiver unit 1475 to obtain samples. A symbol demodulator 1480 then processes the samples and provides received pilot symbols and data symbol estimates for the uplink. An RX data processor 1485 processes the data symbol estimates to recover the traffic data transmitted by terminal 1430. A processor 1490 performs channel estimation for each active terminal transmitting on the uplink. Multiple terminals can transmit pilot concurrently on the uplink on their respective assigned sets of pilot subbands, where the pilot subband sets can be interlaced.

Processors 1490 and 1450 direct (e.g., control, coordinate, manage, etc.) operation at access point 1405 and terminal 1430, respectively. Respective processors 1490 and 1450 can be associated with memory units (not shown) that store program codes and data. Processors 1490 and 1450 can also perform computations to derive frequency and impulse response estimates for the uplink and downlink, respectively.

For a multiple-access system (e.g., SC-FDMA, FDMA, OFDMA, CDMA, TDMA, etc.), multiple terminals can transmit concurrently on the uplink. For such a system, the pilot subbands can be shared among different terminals. The channel estimation techniques can be used in cases where the pilot subbands for each terminal span the entire operating band (possibly except for the band edges). Such a pilot subband structure would be desirable to obtain frequency diversity for each terminal. The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1490 and 1450.

It is to be understood that the embodiments described herein can be implemented in hardware, software, firmware, middleware, microcode, or any suitable combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 15:
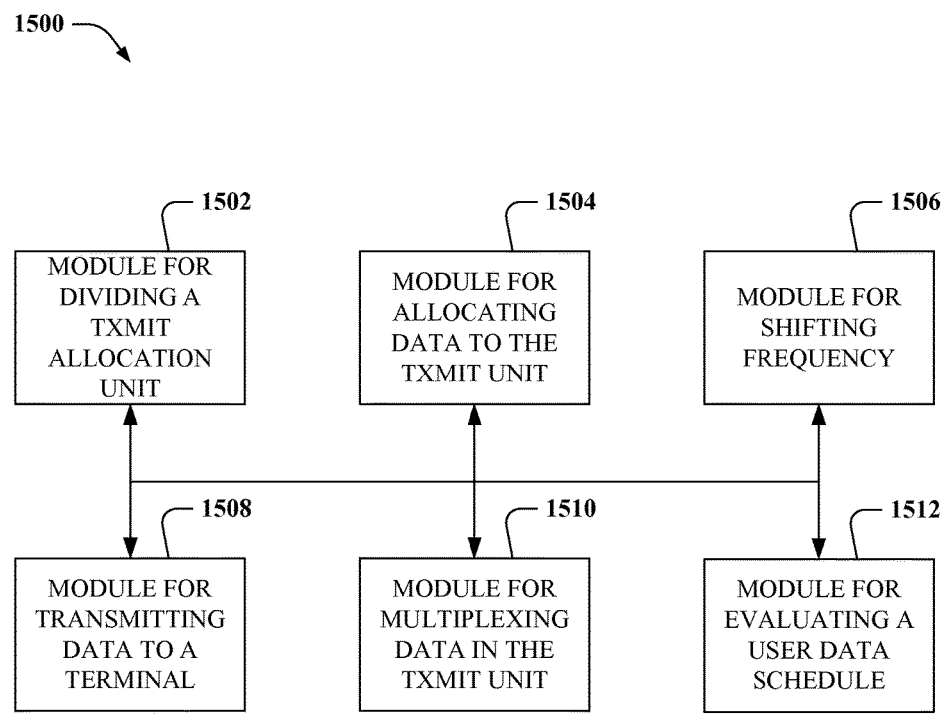
FIG. 15 depicts a system that facilitates frequency hopping for uplink SC-FDMA transmission by one or more user terminals.

With reference to FIG. 15, illustrated is an example system 1500 that provides frequency hopping for SC-FDMA transmissions in a manner that preserves single carrier constraints. For example, system 1500 can resist at least partially within a wireless communication network and/or within a transmitter such as a node, base station, access point, or the like. It is to be appreciated that system 1500 is represented as including functional blocks, which can be functional blocks that represent functions implemented by a processor, software, or combination thereof (e.g., firmware).

System 1500 can include a module 1502 for dividing a transmission allocation unit(s) into at least two time based slots, the time based slots have a plurality of frequency sub-divisions. For instance, such sub-divisions can include a portion of total system frequency spectrum bandwidth. Furthermore, the sub-divisions can be frequency shifted with respect to different time based slots. Data pertaining to a service can be allocated to frequency shifted portions of different time slots to facilitate frequency hopping in an SC-FDMA environment, as described herein. More specifically, frequency sub-divisions of one time slot can be shifted according to a linear cyclic shift with respect to sub-divisions of another time slot. For example, a portion of total system spectrum bandwidth (e.g., substantially half, or a third, or a fourth, etc.) can be utilized to linearly shift frequency sub-divisions within a time slot. Alternatively, or in addition, frequency sub-divisions can be shifted by mirror transposition with respect to a centerline (or, e.g., one or more non-centered lines such as a tertiary line, quadrant line, and so on) of spectrum frequency bandwidth. In addition to the foregoing, frequency hopped and non-frequency hopped sub-divisions can be multiplexed within one or more time slots as described herein.

System 1500 can further include a module 1504 for allocating data to a transmission allocation unit. More specifically, the module 1504 can allocate a portion of user data to a first frequency sub-division of a first time slot, and allocate an additional portion of the user data to a shifted second frequency sub-division of a second subsequent time slot. According to further aspects, system 1500 can include a module for shifting frequency 1506 of an allocation period of portion thereof. For example, the module 1506 can shift a second frequency sub-division with respect to a first as described above.

According to yet another aspect of the subject disclosure, system 1500 can include a module 1508 for transmitting data to a terminal. For instance, the module 1508 can transmit information related to allocation of a first portion of user data and shifted allocation of a second portion of user data to a terminal device for use in an SC-FDMA uplink transmission. As a result, the terminal device can combine low interference and high diversity properties of frequency hopped transmission with low PAPR properties of SC-FDMA transmission.

According to further aspects, system 1500 can include a module 1510 for multiplexing data in a transmission allocation unit. The module 1510 can multiplex user data allocated to a first frequency sub-division of the first time slot and a second frequency sub-division of the second subsequent time slot with additional user data allocated to substantially equivalent frequency sub-divisions associated with the first and second time slots. As a more general example, module 1510 can multiplex cyclic shifted data with mirror transposed data and/or with frequency selective scheduled data. As a result, system 1500 can provide frequency hopping for or non-frequency hopping simultaneously as required by service and/or device constraints.

According to related aspects of the subject innovation, system 1500 can comprise a module 1512 for evaluating a user data schedule. Particularly, module 1512 can evaluate a schedule of user data to identify a second frequency sub-division of a second time slot allocated to a portion of user data, for instance, with respect to related data scheduled to a first sub-division and time slot. As a more specific example, module 1512 can evaluate a schedule of user data to determine whether the user data is allocated across a centerline (or, e.g., one or more non-centered frequency lines) of a transmission bandwidth associated with a transmission allocation unit. As a result, module 1512 can facilitate choosing between one or more frequency hopping mechanisms (e.g., cyclic shift, mirror transposition, and/or multiplexed frequency hopping) as suitable to minimize PAPR and transmission interference, and to maximize frequency diversity.

Figure 16:
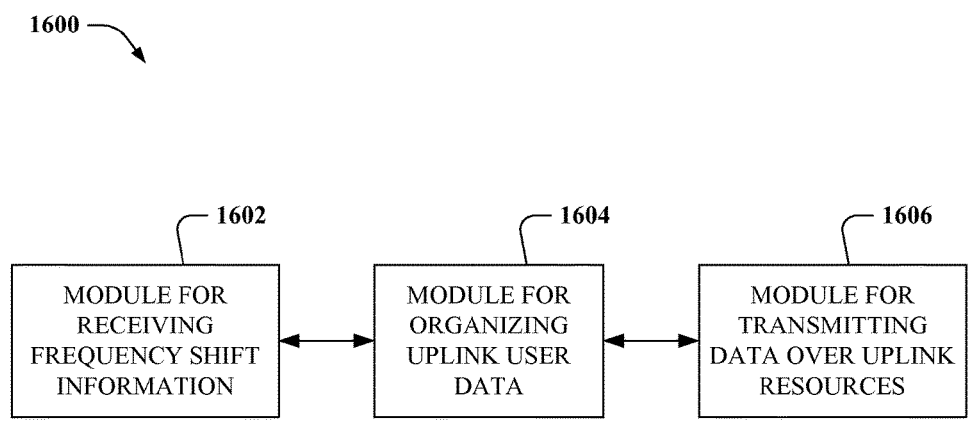
FIG. 16 depicts a system that utilizes frequency hopping for uplink SC-FDMA transmission to one or more network base stations.

With reference to FIG. 16, depicted is an example system 1600 that can utilize frequency hopping in SC-FDMA uplink transmission in accord with one or more aspects. System 1600 may reside at least partially within a mobile device, for instance. As depicted, system 1600 includes functional blocks that may represent functions implemented by a processor, software, or combination thereof (e.g., firmware).

System 1600 can include a module 1602 for receiving frequency shift information. More particularly, the module 1602 can receive information related to frequency-shifted allocation of user data across a plurality of time slots of a transmission allocation unit for use in a SC-FDMA uplink transmission. Furthermore, system 1600 can include a module 1604 for organizing uplink user data. For instance, the module 1604 can organize user data into a transmission data packet in accordance with information received by the module for receiving frequency shift information 1502. More particularly, the data can be organized such that it is frequency shifted with respect to a first and second time slot of the data packet by half of a frequency bandwidth of the transmission allocation unit. Alternatively, or in addition, data can be allocated to frequency shifted sub-divisions of the allocation unit that are transposed across a centerline frequency of a frequency bandwidth associated with the transmission allocation unit. In accordance with still other aspects, data can be allocated to the same frequency sub-division in the first and second slots. As a result, system 1600 can provide for various frequency hopping mechanisms, or no frequency hopping, as required by device and/or service constraints.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for performing frequency hopping in a single carrier frequency division multiple access (SC-FDMA) transmission, comprising:

receiving information related to a transmission allocation unit that spans at least two time based slots comprising first and second slots and a plurality of frequency sub-divisions comprising first and second frequency sub-divisions;

determining a first set of contiguous subcarriers for the first frequency sub-division in the first slot based on the received information, wherein the first frequency sub-division spans a centerline frequency of a transmission bandwidth;

determining the second frequency sub-division in the second slot based on the first frequency sub-division in the first slot and further in accordance with mirror frequency hopping as a function of a transmission bandwidth to obtain a second set of contiguous sub-carriers for the second frequency sub-division, wherein the second frequency sub-division also spans the centerline frequency such that a first upper bound of the second frequency sub-division is equidistant above the centerline frequency as a first lower bound of the first frequency sub-division is below the centerline frequency, and a second lower bound of the second frequency sub-division is equidistant below the centerline frequency as a second upper bound of the first frequency sub-division is above the centerline frequency; and sending data on the first set of contiguous subcarriers in the first frequency sub-division of the first slot and on the second set of contiguous subcarriers in the second frequency sub-division of the second slot.

2. The method of claim 1, wherein the at least two time based slots comprise an equivalent portion of time associated with the transmission allocation unit.

3. The method of claim 1, wherein data from another user is sent in the second frequency sub-division of the first slot and in the first frequency sub-division of the second slot.

4. The method of claim 1, wherein the first frequency sub-division is within a first frequency division at an edge of the transmission bandwidth, and wherein the second frequency sub-division is within a second frequency division at an opposite edge of the transmission bandwidth.

5. The method of claim 1, further comprising:
generating a first plurality of SC-FDMA symbols comprising the data sent on the first set of contiguous subcarriers in the first frequency sub-division of the first slot; and
generating a second plurality of SC-FDMA symbols comprising the data sent on the second set of contiguous subcarriers in the second frequency sub-division of the second slot.

6. An apparatus that performs frequency hopping in a single carrier frequency division multiple access (SC-FDMA) transmission, comprising:
means for receiving information related to a transmission allocation unit that spans at least two time based slots comprising first and second slots and a plurality of frequency sub-divisions comprising first and second frequency sub-divisions;
means for determining a first set of contiguous subcarriers for the first frequency sub-division in the first slot based on the received information, wherein the first frequency sub-division spans a centerline frequency of a transmission bandwidth;
means for determining the second frequency sub-division in the second slot based on the first frequency sub-division in the first slot and further in accordance with mirror frequency hopping as a function of a transmission bandwidth to obtain a second set of contiguous subcarriers for the second frequency sub-division, wherein the second frequency sub-division also spans the centerline frequency such that a first upper bound of the second frequency sub-division is equidistant above the centerline frequency as a first lower bound of the first frequency sub-division is below the centerline frequency, and a second lower bound of the second frequency sub-division is equidistant below the centerline frequency as a second upper bound of the first frequency sub-division is above the centerline frequency; and
means for sending data on the first set of contiguous subcarriers in the first frequency sub-division of the first slot and on the second set of contiguous subcarriers in the second frequency sub-division of the second slot.

7. The apparatus of claim 6, wherein the at least two time based slots comprise an equivalent portion of time associated with the transmission allocation unit.

8. The apparatus of claim 6, wherein data from another user is sent in the second frequency sub-division of the first slot and in the first frequency sub-division of the second slot.

9. The apparatus of claim 6, wherein the first frequency sub-division is within a first frequency division at an edge of the transmission bandwidth, and wherein the second frequency sub-division is within a second frequency division at an opposite edge of the transmission bandwidth.

10. The apparatus of claim 6, further comprising:
means for generating a first plurality of SC-FDMA symbols comprising the data sent on the first set of contiguous subcarriers in the first frequency sub-division of the first slot; and
means for generating a second plurality of SC-FDMA symbols comprising the data sent on the second set of contiguous subcarriers in the second frequency sub-division of the second slot.

11. An apparatus that performs frequency hopping in a single carrier frequency division multiple access (SC-FDMA) transmission, comprising:
at least one processor configured to receive information related to a transmission allocation unit that spans at least two time based slots comprising first and second slots and a plurality of frequency sub-divisions comprising first and second frequency sub-divisions, to determine a first set of contiguous subcarriers for the first frequency sub-division in the first slot based on the received information, to determine the second frequency sub-division in the second slot based on the first frequency sub-division in the first slot and further in accordance with mirror frequency hopping as a function of a transmission bandwidth to obtain a second set of contiguous subcarriers for the second frequency sub-division, and to send the data on the first set of contiguous subcarriers in the first frequency sub-division of the first slot and on the second set of contiguous subcarriers in the second frequency sub-division of the second slot, wherein the first frequency sub-division spans a centerline frequency of a transmission bandwidth, and wherein the second frequency sub-division also spans the centerline frequency such that a first upper bound of the second frequency sub-division is equidistant above the centerline frequency as a first lower bound of the first frequency sub-division is below the centerline frequency, and a second lower bound of the second frequency sub-division is equidistant below the centerline frequency as a second upper bound of the first frequency sub-division is above the centerline frequency.

12. The apparatus of claim 11, wherein the at least two time based slots comprise an equivalent portion of time associated with the transmission allocation unit.

13. The apparatus of claim 11, wherein data from another user is sent in the second frequency sub-division of the first slot and in the first frequency sub-division of the second slot.

14. The apparatus of claim 11, wherein the first frequency sub-division is within a first frequency division at an edge of the transmission bandwidth, and wherein the second frequency sub-division is within a second frequency division at an opposite edge of the transmission bandwidth.

15. The apparatus of claim 11, wherein the at least one processor is further configured to generate a first plurality of SC-FDMA symbols comprising the data sent on the first set of contiguous subcarriers in the first frequency sub-division of the first slot and to generate a second plurality of SC-FDMA symbols comprising the data sent on the second set of contiguous subcarriers in the second frequency sub-division of the second slot.

16. A processor that facilitates frequency hopping in a single carrier frequency division multiple access (SC-FDMA) transmission, comprising:
 means for receiving information related to a transmission allocation unit that spans at least two time based slots comprising first and second slots and a plurality of frequency sub-divisions comprising first and second frequency sub-divisions;
 means for determining a first set of contiguous subcarriers for the first frequency sub-division in the first slot based on the received information, wherein the first frequency sub-division spans a centerline frequency of a transmission bandwidth;
 means for determining the second frequency sub-division in the second slot based on the first frequency sub-division in the first slot and further in accordance with mirror frequency hopping as a function of a transmission bandwidth to obtain a second set of contiguous subcarriers for the second frequency sub-division, wherein the second frequency sub-division also spans the centerline frequency such that a first upper bound of the second frequency sub-division is equidistant above the centerline frequency as a first lower bound of the first frequency sub-division is below the centerline frequency, and a second lower bound of the second frequency sub-division is equidistant below the centerline frequency as a second upper bound of the first frequency sub-division is above the centerline frequency; and
 means for sending data on the first set of contiguous subcarriers in the first frequency sub-division of the first slot and on the second set of contiguous subcarriers in the second frequency sub-division of the second slot.

17. A non-transitory computer-readable medium comprising codes executable by at least one computer to:
 receive information related to a transmission allocation unit that spans at least two time based slots comprising first and second slots and a plurality of frequency sub-divisions comprising first and second frequency sub-divisions;
 determine a first set of contiguous subcarriers for the first frequency sub-division in the first slot based on the received information, wherein the first frequency sub-division spans a centerline frequency of a transmission bandwidth;
 determine the second frequency sub-division in the second slot based on the first frequency sub-division in the first slot and further in accordance with mirror frequency hopping as a function of a transmission bandwidth to obtain a second set of contiguous subcarriers for the second frequency sub-division, wherein the second frequency sub-division also spans the centerline frequency such that a first upper bound of the second frequency sub-division is equidistant above the centerline frequency as a first lower bound of the first frequency sub-division is below the centerline frequency, and a second lower bound of the second frequency sub-division is equidistant below the centerline frequency as a second upper bound of the first frequency sub-division is above the centerline frequency; and
 send data on the first set of contiguous subcarriers in the first frequency sub-division of the first slot and on the second set of contiguous subcarriers in the second frequency sub-division of the second slot.

18. A method for receiving data via a single carrier frequency division multiple access (SC-FDMA) uplink channel utilizing frequency hopping, comprising:
 determining a transmission allocation unit that spans at least two time based slots comprising first and second slots and a plurality of frequency sub-divisions comprising first and second frequency sub-divisions;
 determining a first set of contiguous subcarriers for the first frequency sub-division in the first slot, wherein the first frequency sub-division spans a centerline frequency of a transmission bandwidth;
 determining the second frequency sub-division in the second slot based on the first frequency sub-division in the first slot and further in accordance with mirror frequency hopping as a function of a transmission bandwidth to obtain a second set of contiguous subcarriers for the second frequency sub-division, wherein the second frequency sub-division also spans the centerline frequency such that a first upper bound of the second frequency sub-division is equidistant above the centerline frequency as a first lower bound of the first frequency sub-division is below the centerline frequency, and a second lower bound of the second frequency sub-division is equidistant below the centerline frequency as a second upper bound of the first frequency sub-division is above the centerline frequency; and
 receiving data sent on the first set of contiguous subcarriers in the first frequency sub-division of the first slot and on the second set of contiguous subcarriers in the second frequency sub-division of the second slot.

19. The method of claim 18, further comprising sending information related to the transmission allocation unit.

20. The method of claim 18, further comprising sending information indicative of whether a terminal device selects non-frequency shifted or frequency-shifted frequency sub-divisions for uplink transmission within the transmission allocation unit.

21. An apparatus that receives data via a single carrier frequency division multiple access (SC-FDMA) uplink channel utilizing frequency hopping, comprising:
 means for determining a transmission allocation unit that spans at least two time based slots comprising first and second slots and a plurality of frequency sub-divisions comprising first and second frequency sub-divisions;
 means for determining a first set of contiguous subcarriers for the first frequency sub-division in the first slot, wherein the first frequency sub-division spans a centerline frequency of a transmission bandwidth;
 means for determining the second frequency sub-division in the second slot based on the first frequency sub-division in the first slot and further in accordance with mirror frequency hopping as a function of a transmission bandwidth to obtain a second set of contiguous subcarriers for the second frequency sub-division, wherein the second frequency sub-division also spans the centerline frequency such that a first upper bound of the second frequency sub-division is equidistant above the centerline frequency as a first lower bound of the first frequency sub-division is below the centerline frequency, and a second lower bound of the second frequency sub-division is equidistant below the centerline frequency as a second upper bound of the first frequency sub-division is above the centerline frequency; and means for receiving data sent on the first set of contiguous subcarriers in the first frequency sub-division of the first slot and on the second set of contiguous subcarriers in the second frequency sub-division of the second slot.

22. The apparatus of claim 21, further comprising means for sending information related to the transmission allocation unit.

23. The apparatus of claim 21, further comprising means for sending information indicative of whether a terminal device selects non-frequency shifted or frequency-shifted frequency sub-divisions for uplink transmission within the transmission allocation unit.

24. An apparatus that receives data via a single carrier frequency division multiple access (SC-FDMA) uplink channel utilizing frequency hopping, comprising:
at least one processor configured to determine a transmission allocation unit that spans at least two time based slots comprising first and second slots and a plurality of frequency sub-divisions comprising first and second frequency sub-divisions, to determine a first set of contiguous subcarriers for the first frequency sub-division in the first slot, to determine the second frequency sub-division in the second slot based on the first frequency sub-division in the first slot and further in accordance with mirror frequency hopping as a function of a transmission bandwidth to obtain a second set of contiguous subcarriers for the second frequency sub-division, and to receive the data sent on the first set of contiguous subcarriers in the first frequency sub-division of the first slot and on the second set of contiguous subcarriers in the second frequency sub-division of the second slot, wherein the first frequency sub-division spans a centerline frequency of a transmission bandwidth, and wherein the second frequency sub-division also spans the centerline frequency such that a first upper bound of the second frequency sub-division is equidistant above the centerline frequency as a first lower bound of the first frequency sub-division is below the centerline frequency, and a second lower bound of the second frequency sub-division is equidistant below the centerline frequency as a second upper bound of the first frequency sub-division is above the centerline frequency.

25. The apparatus of claim 24, wherein the at least one processor is further configured to send information related to the transmission allocation unit.

26. The apparatus of claim 24, wherein the at least one processor is further configured to select between non-frequency shifted and frequency-shifted frequency sub-divisions for uplink transmission within the transmission allocation unit.

27. A processor that receives data via a single carrier frequency division multiple access (SC-FDMA) uplink channel utilizing frequency hopping, comprising:
means for determining a transmission allocation unit that spans at least two time based slots comprising first and second slots and a plurality of frequency sub-divisions comprising first and second frequency sub-divisions;
means for determining a first set of contiguous subcarriers for the first frequency sub-division in the first slot, wherein the first frequency sub-division spans a centerline frequency of a transmission bandwidth;
means for determining the second frequency sub-division in the second based on the first frequency sub-division in the first slot and further in accordance with mirror frequency hopping as a function of a transmission bandwidth to obtain a second set of contiguous subcarriers for the second frequency sub-division, wherein the second frequency sub-division also spans the centerline frequency such that a first upper bound of the second frequency sub-division is equidistant above the centerline frequency as a first lower bound of the first frequency sub-division is below the centerline frequency, and a second lower bound of the second frequency sub-division is equidistant below the centerline frequency as a second upper bound of the first frequency sub-division is above the centerline frequency; and
means for receiving data sent on the first set of contiguous subcarriers in the first frequency sub-division of the first slot and on the second set of contiguous subcarriers in the second frequency sub-division of the second slot.

28. A non-transitory computer-readable medium comprising codes executable by at least one computer to:
determine a transmission allocation unit that spans at least two time based slots comprising first and second slots and a plurality of frequency sub-divisions comprising first and second frequency sub-divisions;
determine a first set of contiguous subcarriers for the first frequency sub-division in the first slot, wherein the first frequency sub-division spans a centerline frequency of a transmission bandwidth;
determine the second frequency sub-division in the second slot based on the first frequency sub-division in the first slot and further in accordance with mirror frequency hopping as a function of a transmission bandwidth to obtain a second set of contiguous subcarriers for the second frequency sub-division, wherein the second frequency sub-division also spans the centerline frequency such that a first upper bound of the second frequency sub-division is equidistant above the centerline frequency as a first lower bound of the first frequency sub-division is below the centerline frequency, and a second lower bound of the second frequency sub-division is equidistant below the centerline frequency as a second upper bound of the first frequency sub-division is above the centerline frequency; and
receive data sent on the first set of contiguous subcarriers in the first frequency sub-division of the first slot and on the second set of contiguous subcarriers in the second frequency sub-division of the second slot.

29. The method of claim 1, wherein the first frequency sub-division comprises a configurable number of contiguous subcarriers, and wherein the second frequency sub-division comprises an equal number of contiguous subcarriers as the first frequency sub-division.

30. The method of claim 1, wherein the first and second frequency sub-divisions are selected from a set of frequency sub-divisions allocated to frequency hopped scheduling (FHS), and wherein at least one frequency sub-division is allocated to frequency selective scheduling (FSS).

31. The method of claim 1, wherein the data sent in the first frequency sub-division of the first slot and the second frequency sub-division of the second slot comprises control data, or user data, or both.

32. The method of claim 18, wherein the first frequency sub-division comprises a configurable number of contiguous subcarriers, and wherein the second frequency sub-division comprises an equal number of contiguous subcarriers as the first frequency sub-division.

33. The method of claim 18, wherein the first and second frequency sub-divisions are selected from a set of frequency sub-divisions allocated to frequency hopped scheduling (FHS), and wherein at least one frequency sub-division is allocated to frequency selective scheduling (FSS).

34. The method of claim 18, wherein the data sent in the first frequency sub-division of the first slot and the second frequency sub-division of the second slot comprises control data, or user data, or both.

\* \* \* \* \*